United States Patent
Davies et al.

(10) Patent No.: US 12,011,746 B2
(45) Date of Patent: Jun. 18, 2024

(54) SEWER CLEANING MACHINE

(71) Applicant: MILWAUKEE ELECTRIC TOOL CORPORATION, Brookfield, WI (US)

(72) Inventors: Peter J. Davies, Milwaukee, WI (US); Matt R. Wolf, Milwaukee, WI (US); Sean T. Kehoe, Hartland, WI (US); Justin Miller, Milwaukee, WI (US); Samuel J. Ferrec, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 186 days.

(21) Appl. No.: 17/536,528

(22) Filed: Nov. 29, 2021

(65) Prior Publication Data

US 2022/0080472 A1 Mar. 17, 2022

Related U.S. Application Data

(63) Continuation of application No. 16/241,361, filed on Jan. 7, 2019, now Pat. No. 11,185,897.

(Continued)

(51) Int. Cl.
*B08B 9/045* (2006.01)
*E03C 1/302* (2006.01)
*E03F 9/00* (2006.01)

(52) U.S. Cl.
CPC ............. *B08B 9/045* (2013.01); *E03C 1/302* (2013.01); *E03F 9/005* (2013.01)

(58) Field of Classification Search
CPC .......... E03F 9/002; E03F 9/005; B08B 9/045; E03C 1/302
See application file for complete search history.

(56) References Cited

U.S. PATENT DOCUMENTS

| 2,355,733 A | 8/1944 | Johnson et al. |
| 2,930,584 A | 3/1960 | Hensley et al. |

(Continued)

FOREIGN PATENT DOCUMENTS

| CN | 2145653 Y | 11/1993 |
| CN | 2464800 Y | 12/2004 |

(Continued)

OTHER PUBLICATIONS

European Search Report for Application No. 17183628.1 dated Dec. 8, 2017 (15 pages).

(Continued)

*Primary Examiner* — Shay Karls
(74) *Attorney, Agent, or Firm* — Michael Best & Friedrich LLP

(57) ABSTRACT

A sewer cleaning machine including a rotatable drum, a cable positioned at least partially within the drum, the cable configured to be extended from and retracted into the drum along a cable axis, a motor coupled to the drum, the motor operable to rotate the drum, and a cable feed mechanism including a plurality of bearings arranged concentrically around the cable, the plurality of bearings configured to selectively engage the cable to feed the cable in a first linear direction along the cable axis, a cam ring including a plurality of cam surfaces, each of the plurality of cam surfaces engageable with a corresponding one of the plurality of bearings, and a handle configured to rotate the cam ring about the cable axis to move the plurality of cam surfaces into engagement with the first plurality of bearings.

20 Claims, 20 Drawing Sheets

Related U.S. Application Data

(60) Provisional application No. 62/730,646, filed on Sep. 13, 2018, provisional application No. 62/614,169, filed on Jan. 5, 2018.

(56) References Cited

U.S. PATENT DOCUMENTS

| | | |
|---|---|---|
| 3,025,547 A | 3/1962 | Ciaccio |
| 3,075,217 A | 1/1963 | Kollmann |
| 3,159,861 A | 12/1964 | Sarcone |
| 3,206,782 A | 9/1965 | Larsen |
| 3,246,354 A | 4/1966 | Cooney et al. |
| 3,414,926 A | 12/1968 | Bloom |
| 3,449,782 A | 6/1969 | Hunt |
| 3,544,051 A | 12/1970 | Norman |
| 3,691,583 A | 9/1972 | Silverman et al. |
| 3,703,015 A * | 11/1972 | Naeve .................. E03F 9/005 15/104.33 |
| 3,727,261 A | 4/1973 | Levine |
| 3,747,153 A | 7/1973 | O'Neill |
| 3,882,565 A | 5/1975 | Irwin et al. |
| 3,928,885 A | 12/1975 | Peterson et al. |
| 4,218,802 A | 8/1980 | Babb et al. |
| 4,356,557 A | 10/1982 | Bell et al. |
| 4,364,139 A | 12/1982 | Babb et al. |
| 4,395,791 A | 8/1983 | Irwin |
| 4,540,017 A | 9/1985 | Prange |
| 4,580,306 A | 4/1986 | Irwin |
| 4,686,732 A | 8/1987 | Irwin |
| 4,793,017 A | 12/1988 | Kaye |
| 4,916,772 A | 4/1990 | Russell et al. |
| 4,956,889 A | 9/1990 | Kirk |
| 4,989,323 A | 2/1991 | Casper et al. |
| 5,009,242 A | 4/1991 | Prange |
| 5,029,356 A | 7/1991 | Silverman et al. |
| 5,031,263 A | 7/1991 | Babb et al. |
| 5,031,276 A * | 7/1991 | Babb .................. B08B 9/045 280/43.12 |
| 5,235,718 A | 8/1993 | Grimsley et al. |
| 5,414,888 A | 5/1995 | Irwin |
| 5,526,975 A | 6/1996 | Endo |
| 5,901,401 A | 5/1999 | Rutkowski et al. |
| 6,076,219 A | 6/2000 | Irwin |
| 6,343,398 B1 | 2/2002 | Silverman et al. |
| 6,360,397 B1 | 3/2002 | Babb |
| 6,412,136 B1 | 7/2002 | Rutkowski |
| 6,470,525 B1 | 10/2002 | Silverman |
| 6,615,436 B1 | 9/2003 | Burch, Jr. et al. |
| 6,637,064 B2 | 10/2003 | Silverman et al. |
| 6,655,228 B1 | 12/2003 | Margherio et al. |
| 6,745,487 B1 | 6/2004 | Nield |
| 7,007,399 B2 | 3/2006 | Catalano |
| 7,478,451 B2 | 1/2009 | Rutkowski et al. |
| 7,676,879 B1 | 3/2010 | Rutenberg et al. |
| 7,685,669 B2 | 3/2010 | Rutkowski et al. |
| 7,889,980 B2 | 2/2011 | Sooy |
| 7,988,157 B2 | 8/2011 | Rembos et al. |
| 8,046,862 B2 | 11/2011 | Eisermann et al. |
| 8,176,593 B2 | 5/2012 | Gress et al. |
| 8,413,347 B2 | 4/2013 | Gress et al. |
| 8,439,371 B1 | 5/2013 | Vazquez |
| 8,826,483 B2 | 9/2014 | Rutkowski et al. |
| 8,970,211 B1 | 3/2015 | Olsson et al. |
| 9,041,794 B1 | 5/2015 | Olsson et al. |
| 9,827,067 B2 | 11/2017 | Iwasaki et al. |
| 10,071,401 B2 | 9/2018 | Punkin et al. |
| 2005/0193509 A1 | 9/2005 | Rutkowski et al. |
| 2007/0089254 A1 | 4/2007 | Alaine |
| 2008/0148503 A1 | 6/2008 | Babb et al. |
| 2008/0244816 A1 | 10/2008 | Babb et al. |
| 2008/0313831 A1 | 12/2008 | Kovach et al. |
| 2009/0211044 A1 | 8/2009 | Hale et al. |
| 2013/0160227 A1 | 6/2013 | Rutkowski et al. |
| 2014/0202492 A1 | 7/2014 | Grossman et al. |
| 2014/0271095 A1 | 9/2014 | Umans et al. |
| 2017/0284078 A1 | 10/2017 | Puzio et al. |
| 2020/0217060 A1 | 7/2020 | Miller et al. |

FOREIGN PATENT DOCUMENTS

| | | |
|---|---|---|
| CN | 203049728 U | 7/2013 |
| CN | 203270721 U | 11/2013 |
| CN | 203346973 U | 12/2013 |
| CN | 104120767 A | 10/2014 |
| CN | 204482269 U | 7/2015 |
| DE | 3423464 A1 | 1/1986 |
| DE | 4211146 A1 | 10/1993 |
| DE | 10248411 A1 | 4/2004 |
| EP | 0683279 A2 | 11/1995 |
| FR | 2611539 A1 | 9/1988 |
| WO | 2006112848 A1 | 10/2006 |
| WO | 2007008885 A2 | 1/2007 |
| WO | 2008124230 A1 | 10/2008 |
| WO | 2009143497 A2 | 11/2009 |
| WO | 2016106110 A1 | 6/2016 |

OTHER PUBLICATIONS

European Search Report for Application No. 17183622.4 dated Dec. 8, 2017 (10 pages).
European Search Report for Application No. 17183628.1 dated Jun. 28, 2018 (14 pages).
International Search Report and Written Opinion for Application No. PCT/2019/012509 dated Apr. 23, 20191(15 pages).
Partial Supplementary European Search Report for Application No. 19736095.1 dated Aug. 2, 2021 (13 pages).
Extended European Search Report for Application No. 22173384.3 dated Sep. 6, 2022 (9 pages).

* cited by examiner

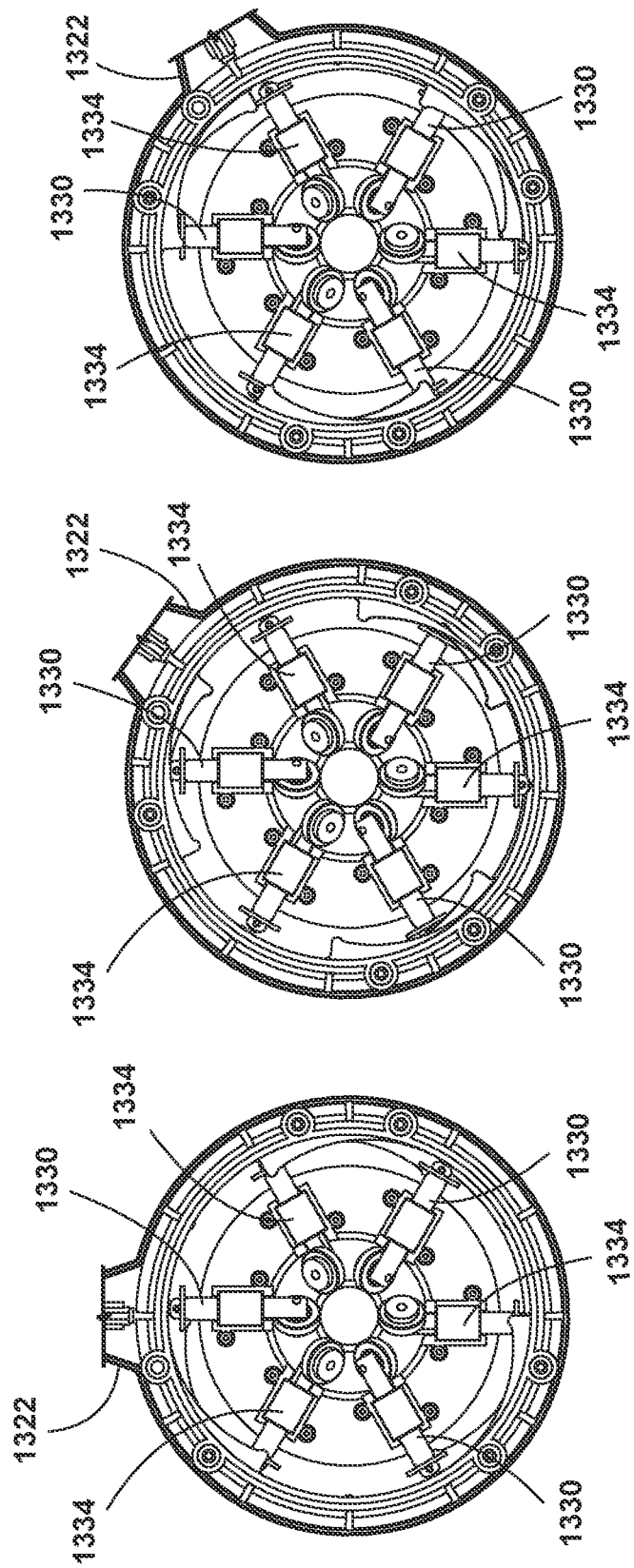

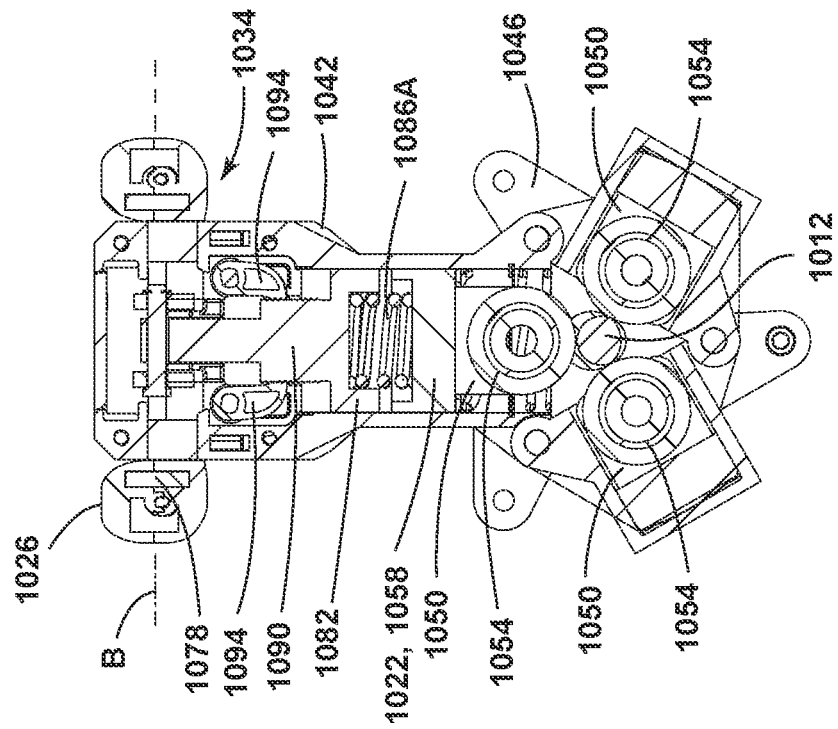
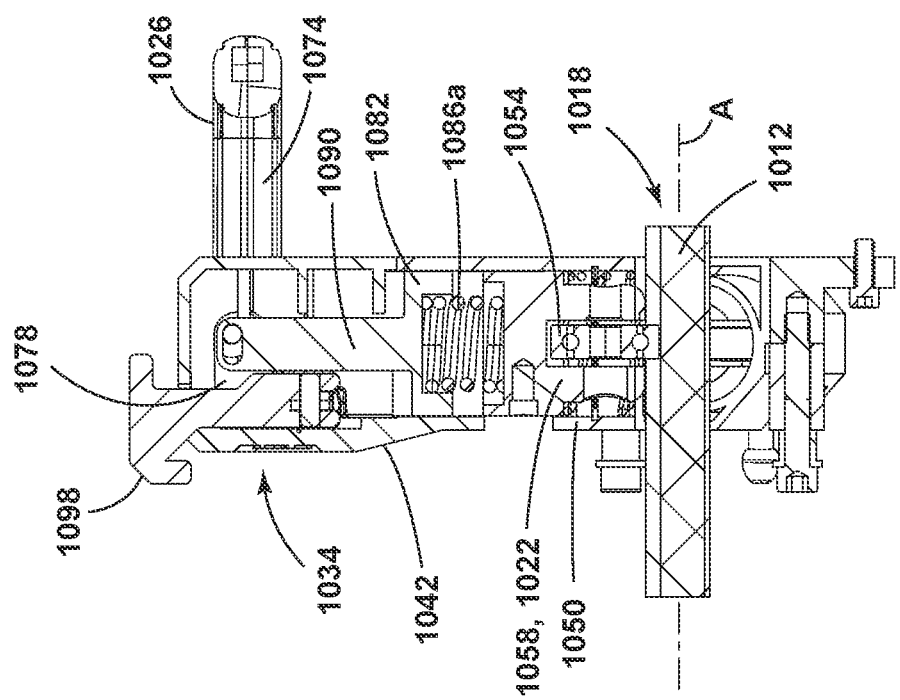
FIG. 23
FIG. 22

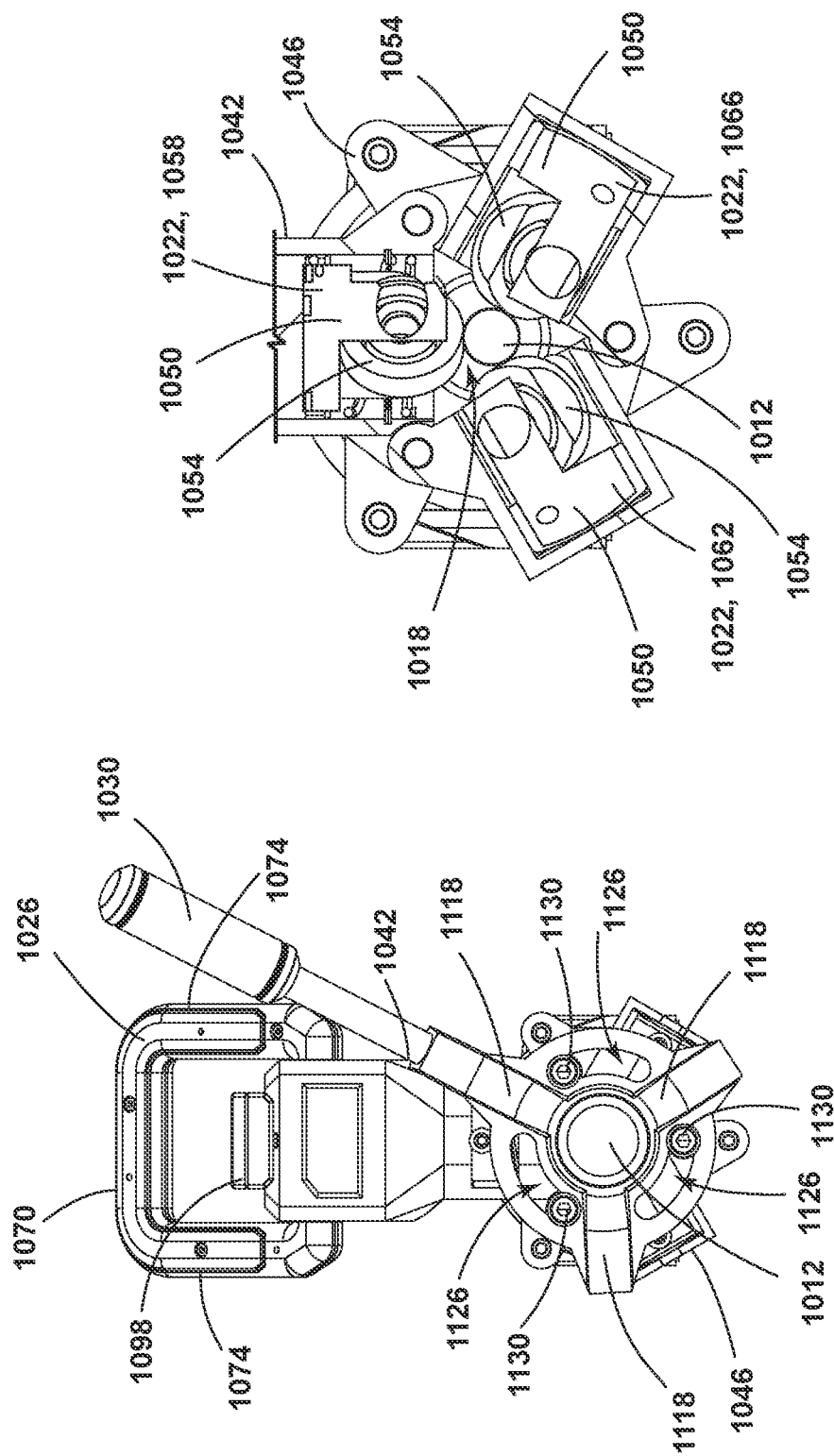

SEWER CLEANING MACHINE

CROSS-REFERENCE TO RELATED APPLICATIONS

This application is a continuation of U.S. patent application Ser. No. 16/241,361, filed Jan. 7, 2019, now U.S. Pat. No. 11,185,897, which claims priority to U.S. Provisional Patent Application No. 62/730,646, filed Sep. 13, 2018, and U.S. Provisional Application No. 62/614,169, filed Jan. 5, 2018, the entire contents of which are all incorporated by reference herein.

FIELD OF INVENTION

The present invention relates to sewer cleaning machines for cleaning drains, pipes, or other conduits.

BACKGROUND

Sewer cleaning machines are used to clean clogs and debris out of drains, sewers, and the like. Smaller handheld drain cleaners may be used to clean household drains from sinks or shower drains. However, larger and heavier cleaning machines are often used to clean sewers and industrial drains. A sewer cleaning machine may have as much as 200-300 feet of cable and a weight of 200-300 lbs. Accordingly, some sewer cleaning machines may be cumbersome to transport.

SUMMARY OF THE INVENTION

In a first aspect, the invention provides a sewer cleaning machine including a frame and a drum rotatably supported by the frame. The drum is positioned on a first side of the frame. The sewer cleaning machine also includes a first motor coupled to the drum. The first motor is operable to rotate the drum. The sewer cleaning machine further includes a cable positioned at least partially within the drum. The cable is configured to be extended from and retracted into the drum. The sewer cleaning machine also includes a track positioned on a second side of the frame. The track includes a first endless belt configured to rotate about a first roller. The sewer cleaning machine further includes a second motor coupled to the first roller. The second motor is operable to drive the track.

In a second aspect, the track may further include a second roller spaced apart from the first roller, and the first endless belt may be configured to rotate around both the first and second rollers.

In a third aspect, the first roller may be a driven roller, and the second roller may be a non-driven roller.

In a fourth aspect, the sewer cleaning machine may further include a power supply coupled to the first motor or the second motor or both.

In a fifth aspect, the power supply may be operable to alternately power either the first motor or the second motor.

In a sixth aspect, the power supply may include a battery receptacle configured to receive a rechargeable power tool battery pack.

In a seventh aspect, the track may include a second endless belt configured to rotate about a second roller.

In an eight aspect, the track may include a drive shaft extending between the first and second rollers, and the second motor may be operable to rotate the drive shaft to drive the first and second endless belts.

In a ninth aspect, the first endless belt may include traction elements to assist in gripping a surface.

In a tenth aspect, the drum may be rotatable about a first axis of rotation, and the first roller may rotate about a second axis of rotation that is perpendicular to the first axis of rotation.

In an eleventh aspect, the sewer cleaning machine may further include first and second wheels positioned on the frame, and the track may be positioned between the first and second wheels.

In a twelfth aspect, the drum may remain rotatably stationary while the endless belt rotates.

In a thirteenth aspect, the sewer cleaning machine may further include a cable feed device supported by the frame and configured to extend the cable out of the drum.

In a fourteenth aspect, the invention provides a sewer cleaning machine including a frame and a drum rotatably supported by the frame. The drum has an opening. The sewer cleaning machine also includes a cable positioned at least partially within the drum. The cable is configured to be extended from and retracted into the drum through the opening. The sewer cleaning machine further includes a cable feed device supported by the frame adjacent the opening of the drum. The cable feed device includes a plurality of bearings selectively engagable with the cable to feed the cable in or out of the drum, a first level configured to move at least one of the plurality of bearings into engagement with the cable, and a second lever configured to adjust at least one of the plurality of bearings between a forward orientation and a reverse orientation.

In a fifteenth aspect, the first lever may be rotatable about a first axis to move the plurality of bearings into engagement with the cable, the second lever may be rotatable about a second axis to adjust the plurality of bearings between the forward feed orientation and the reverse feed orientation, and the second axis may be perpendicular to the first axis.

In a sixteenth aspect, the plurality of bearings may be arranged concentrically about the cable, and the plurality of bearings may include a first bearing movable relative to a second bearing and to a third bearing.

In a seventeenth aspect, the cable feed device may further include a locking assembly having a ratchet gear and a pawl engagable with the ratchet gear to selectively hold the plurality of bearings in the forward feed orientation or the reverse feed orientation.

In an eighteenth aspect, each of the plurality of bearings may include a bearing carrier and a roller rotatably supported by the bearing carrier, and each roller may have an axis of rotation.

In a nineteenth aspect, rotation of the second lever may rotate each of the bearing carriers and may adjust the axis of rotation of each of the rollers.

In a twentieth aspect, the invention provides a sewer cleaning machine including a frame and a drum rotatably supported by the frame. The drum has an opening. The sewer cleaning machine also includes a first motor supported by the frame and coupled to the drum. The first motor is operable to rotate the drum. The sewer cleaning machine further includes a cable positioned at least partially within the drum. The cable is configured to be extended form and retracted into the drum through the opening. The sewer cleaning machine also includes a track positioned on a second side of the frame. The track includes a first endless belt configured to rotate about a first roller and a second endless belt configured to rotate about a second roller. The sewer cleaning machine further includes a second motor supported by the frame and coupled to the first roller and the second roller. The second motor is operable to drive the track. The sewer cleaning machine also includes a cable feed device supported by the frame adjacent the drum. The cable feed device includes a plurality of bearings selectively engagable with the cable to feed the cable in or out of the drum, a first lever configured to move at least one of the plurality of bearings into engagement with the cable, a second lever configured to adjust at least one of the plurality of bearings between a forward feed orientation and a reverse feed orientation.

In a twenty first aspect, the invention provides a sewer cleaning machine including a frame and a drum rotatably supported by the frame. The drum has an opening. The sewer cleaning machine also includes a cable positioned at least partially within the drum. The cable is configured to be extended from and retracted into the drum through the opening. The sewer cleaning machine further includes a cable feed device supported by the frame adjacent the opening of the drum. The cable feed device includes a plurality of bearings selectively engagable with the cable to feed the cable in or out of the drum, a first lever configured to move at least one of the plurality of bearings into engagement with the cable, a second lever configured to adjust at least one of the plurality of bearings between a forward feed orientation and a reverse feed orientation, and a locking assembly having a ratchet gear and a pawl engagable with the ratchet gear to selectively hold the at least one of the plurality of bearings in the forward feed orientation or the reverse feed orientation.

The above aspects may be implemented in different combinations and not necessarily in the ordered presented. Other aspects of the invention will become apparent by consideration of the detailed description and accompanying drawings.

BRIEF DESCRIPTION OF THE DRAWINGS

FIG. 10 is a front cross sectional view of the cable feed device of FIG. 8 in a first position.

FIG. 11 is a front cross sectional view of the cable feed device of FIG. 8 in a second position.

FIG. 12 is a front cross sectional view of the cable feed device of FIG. 8 in a third position.

FIG. 22 is a side cross-sectional view of the cable feed device of FIG. 18 in an engaged position.

FIG. 23 is a front cross-sectional view of the cable feed device of FIG. 18 in the engaged position.

FIG. 28 is a front view of the cable feed device of FIG. 18 with the second lever in a forward feed position.

FIG. 29 is a detailed view of the plurality of bearings of FIG. 27 in the forward feed position.

Figure 1:
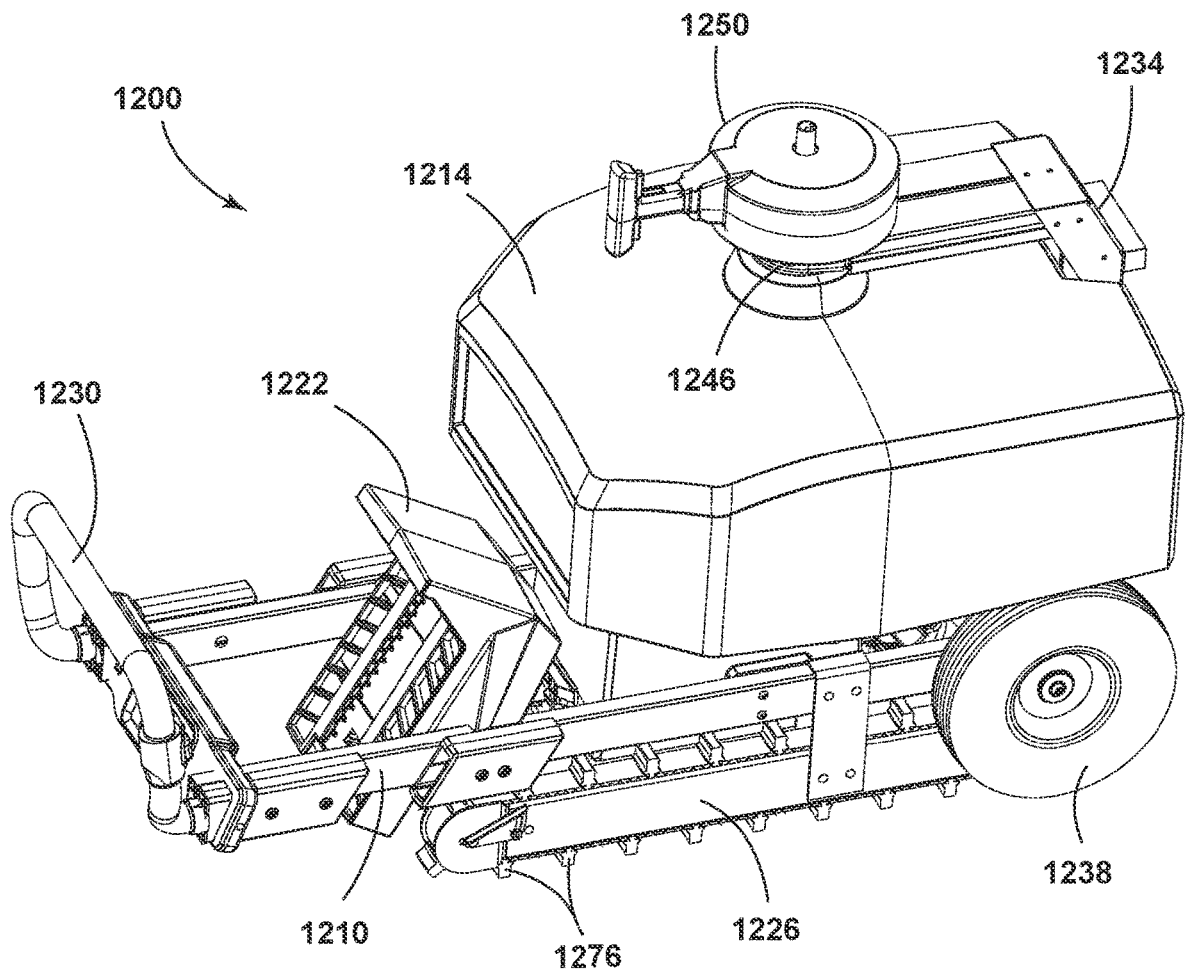
FIG. 1 is a front perspective view of a sewer cleaning machine.
Figure 2:
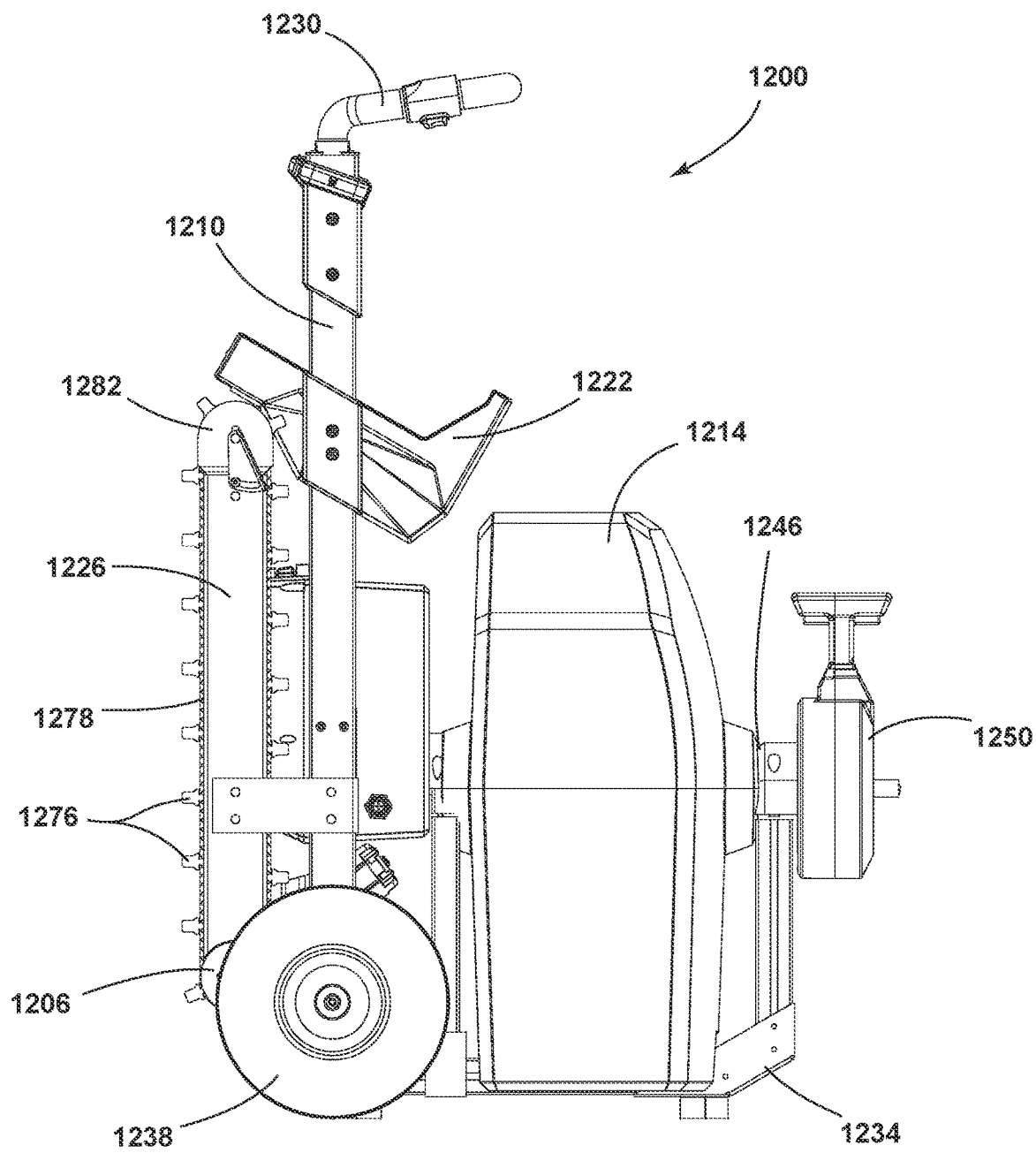
FIG. 2 is a side view of the sewer cleaning machine of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

FIGS. 1-4 illustrate a sewer cleaning machine 1200 including a frame 1210, a drum housing 1214, a motor housing 1218, a power supply 1222, and a track 1226. The frame 1210 includes a handle 1230, a base 1234 that supports the drum housing 1214, and wheels 1238. A drum 1242 is rotatably supported within the drum housing 1214 and includes a cable (not shown in FIGS. 1-4) that is extendable out of an opening 1246 on the drum 1242. In some embodiments, the drum 1242 is a cage-style drum that when the drum housing 1214 is opened allows easy access to the cable so a user can inspect the cable. The cable is extendable out of the drum with a cable feed device 1250, which is discussed in more detail below. A first motor 1254 is supported within the motor housing 1218 and is coupled to the drum 1242. The first motor 1254 is operable to rotate the drum 1242. Rotation of the drum 1242 creates friction between an inner surface of the drum 1242 and the cable, which causes the cable to spin to facilitate clearing debris from a drain pipe or another conduit.

The track 1226 is configured to engage a surface, such as stairs or a ramp to help a user maneuver the sewer cleaning machine 1220. In the illustrated embodiment, the track 1226 is positioned on the opposite side of the frame 1210 as the drum 1242. For example, the drum 1242 is positioned on a front side of the frame 1210 and the track 1226 is positioned on a back side of the frame 1210. In other embodiments the track 1226 can be positioned on either the left or right side of the frame 1210.

The track 1226 includes a substantially horizontal drive shaft 1258 with a first drive roller 1262 at one end and a second drive roller 1266 at another end. A first endless belt 1270 extends around the first drive roller 1262 and a first idler roller 1274, and a second endless belt 1278 extends around the second drive roller 1266 and a second idler roller 1282. The endless belts 1270, 1278 extend substantially vertically along a length of the frame 1210. In some embodiments, the track 1226 may only include a first endless belt 1270 and respective rollers 1262, 1274 rather than including first and second endless belts 1270, 1278. In some embodiments, the endless belts 1270, 1278 include traction elements that assists in gripping a surface, ledge, or other object. For example, in the illustrated embodiment, the endless belts 1270, 1278 include castellations 1276, or projections, that help grip various surfaces. In further embodiments, the endless belts 1270, 1278 include replaceable cleats that can be replaced when worn down instead of replacing the entire track 1226. In other embodiments, the track 1226 can articulate or expand and retract to better climb stairs.

Figure 3:
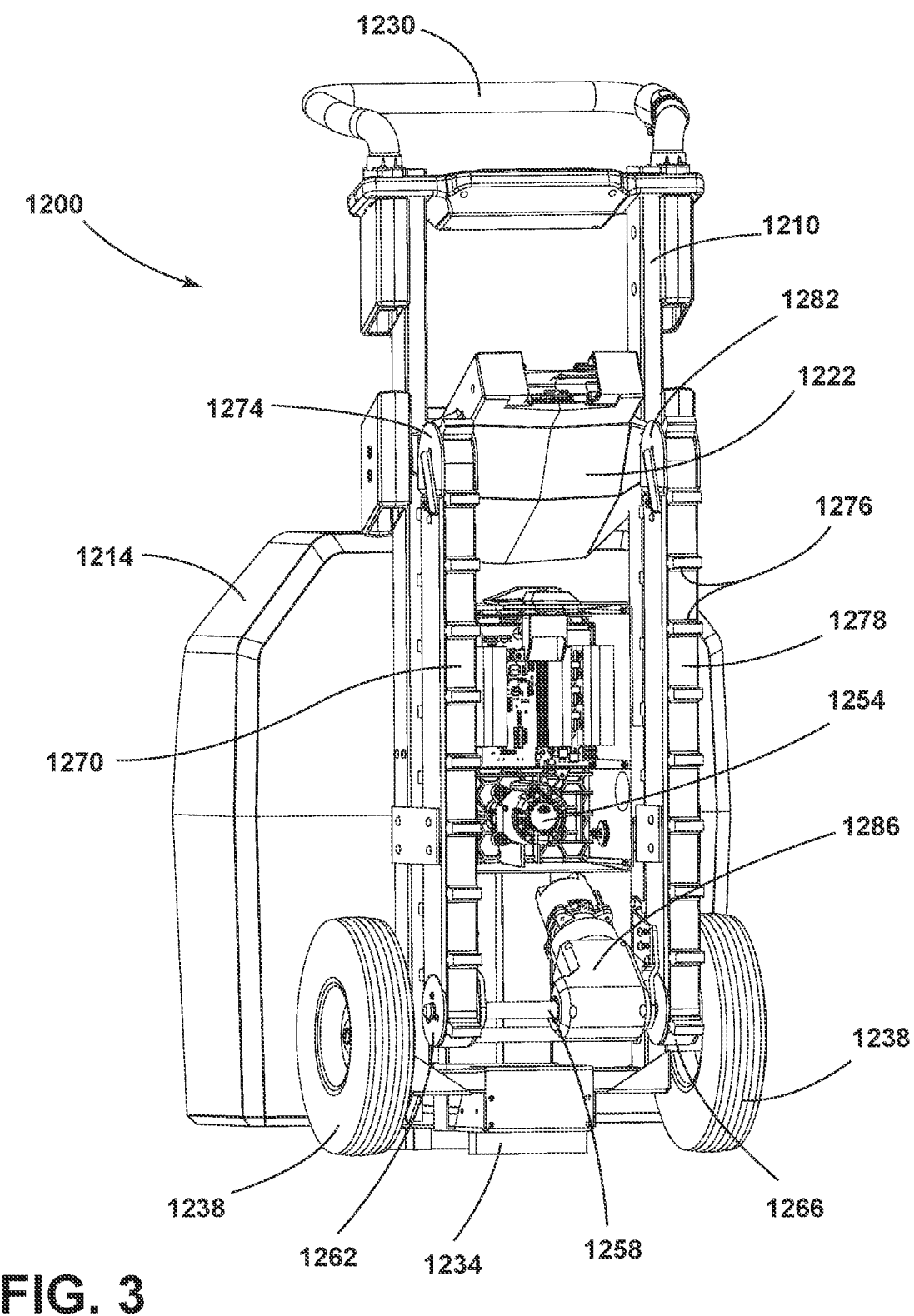
FIG. 3 is a rear perspective view of the sewer cleaning machine of FIG. 1 with a motor housing removed.
Figure 4:
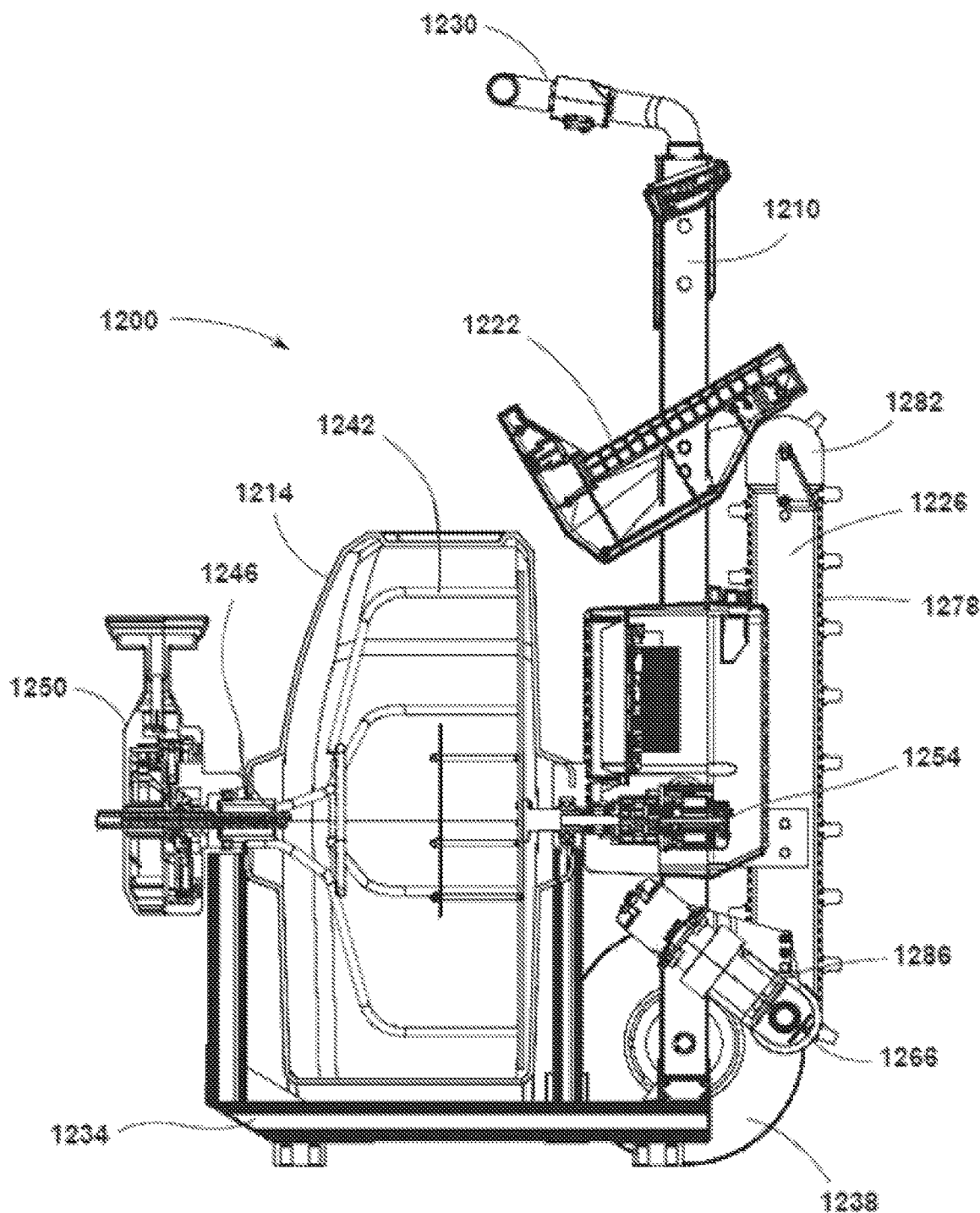
FIG. 4 is a cross-sectional view of the sewer cleaning machine of FIG. 1.

As shown in FIG. 3, a second motor 1286 is supported by the frame 1210 and is coupled to the drive shaft 1258 of the track 1226. The second motor 1286 is operable to rotate the drive shaft 1258 and thus the drive rollers 1262, 1266 to facilitate rotation of the endless belts 1270, 1278. In other embodiments, the track 1226 is passively driven rather than motor driven. For example, the endless belts 1270, 1278 of the track 1226 may be rotated by engagement with a surface, such as stairs or a ramp, as a user pulls the sewer cleaning machine 1200. Regardless of whether the track 1226 is motor driven or passively driven, the track 1226 is decoupled from the drum 1242 in that the track 1226 is independently rotated without affecting the rotation of the drum 1242.

In the illustrated embodiment, both the first and second motors 1254, 1286 are powered by the power supply 1222 that is supported on the frame 1210. The first and second motors 1254, 1286 are, for example, brushless motors. In additional embodiments, the first and second motors 1254, 1286 are variable two speed motors. In the illustrated embodiment, the power supply 1222 includes a battery receptacle that receives a battery pack to provide D/C power to the sewer cleaning machine 1200. For example, the battery receptacle may removably receive a rechargeable power tool battery pack. In further embodiments, the power supply 1222 may receive more than one battery pack to power the sewer cleaning machine 1200. In alternative embodiments, the power supply 1222 may be coupled to a power outlet to provide A/C power to the sewer cleaning machine 1200.

The power supply 1222 includes a controller that may control operation of the first and second motors 1254, 1286. In some embodiments, the controller ensures that when one motor is operating the other motor is locked out and cannot be run. As previously mentioned, the track 1226 is decoupled from the drum 1242 such that rotation of one is independent of the other. In some embodiments, the controller actively decouples the track 1226 from the drum 1242 so that they cannot operate at the same time. In other embodiments, the track 1226 is decoupled from the drum 1242 only by lack of mechanical connection to the drum 1242. Additionally, the sewer cleaning machine 1200 may include switches, buttons, a user interface, or other control features that allow a user to selectively control the sewer cleaning machine 1200. Further, the power supply 1222 or the battery may include a battery fuel gauge to indicate to a user how much longer the battery will last. In addition, the sewer cleaning machine 1200 may include battery detection that indicates to a user if the sewer cleaning machine 1200 has enough power to climb a standard set of stairs and, if not, lock out the tracks 1226 from being operated.

Figure 5:
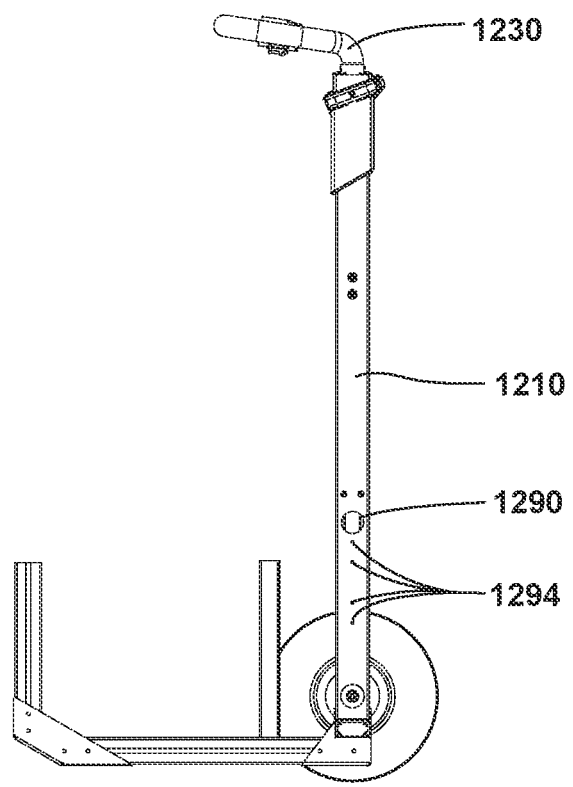
FIG. 5 is a side view of a frame of the sewer cleaning machine of FIG. 1.
Figure 6:
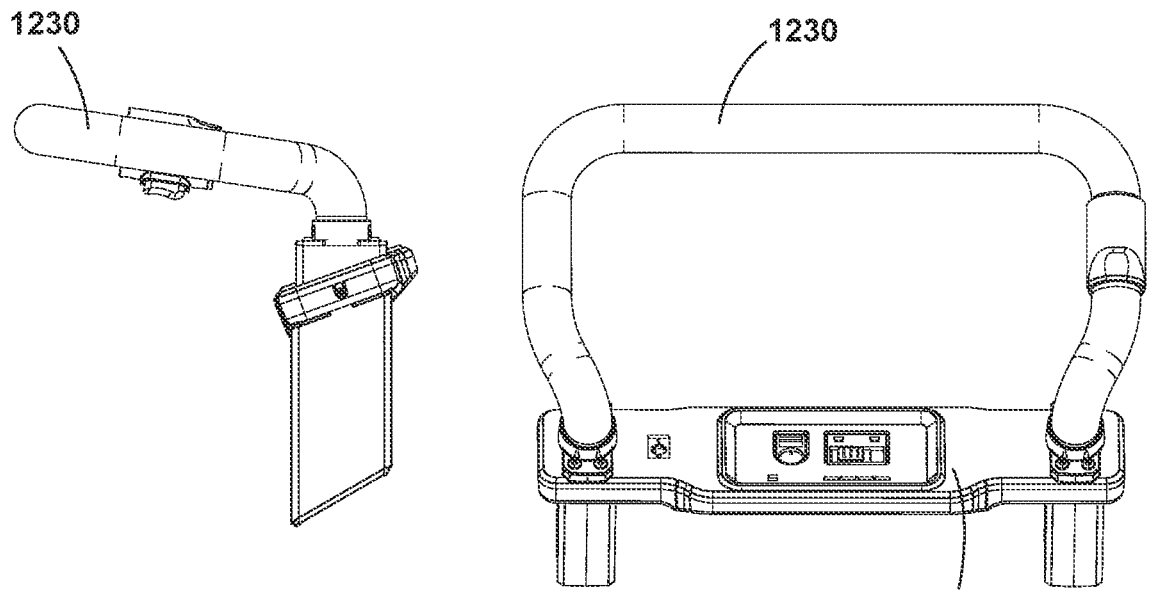
FIG. 6 includes front and side views of a handle of the sewer cleaning machine of FIG. 1.

As shown in FIGS. 5 and 6, the sewer cleaning machine 1200 includes a handle 1230. The handle 1230 may be an articulating handle that moves relative to the frame by, for example, depressing a pin 1290 within a slot 1294 and moving the handle 1230 until the pin 1290 aligns with another slot 1294. The handle 1230 may further include a user interface 1298 (e.g., actuators, indicators, a touch-screen, etc.) through which a user may control the sewer cleaning machine 1200.

Figure 7:
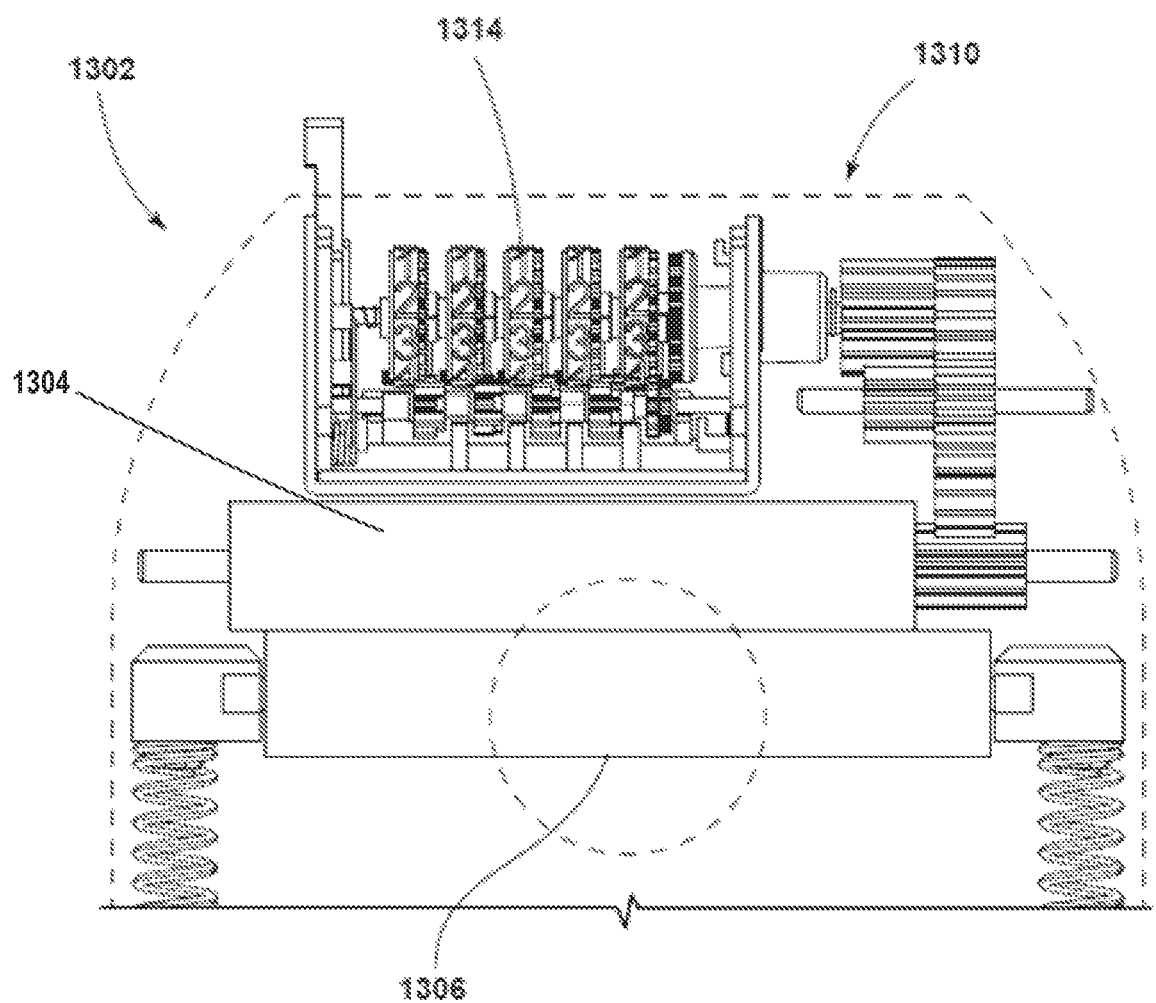
FIG. 7 is a front view of a cable counter of the sewer cleaning machine of FIG. 1.

As shown in FIG. 7, the sewer cleaning machine 1200 may include a cable counter 1302. The cable counter 1302 may be positioned adjacent the opening 1246 on the drum 1242 to determine the amount of cable that has been payed out from the drum 1242. The cable counter 1302 includes a stationary roller 1304, a movable roller 1306, a gear system 1310 coupled to the stationary roller 1304, and a counter 1314 coupled to the gear system 1310. The cable is directed out of the drum 1242 between the stationary roller 1304 and the movable roller 1306. The movable roller 1306 is biased toward the stationary roller 1304 by one or more springs to maintain pressure on the cable between the rollers 1304, 1306. As the cable is payed out from the drum 1242, the cable rotates the stationary roller 1304, which transfers rotation to the gear system 1310. The gear system 1310 uses a gear reduction mechanism to equate the amount of roller rotation to the amount of cable payed out for incrementing on the counter 1314. The counter 1314 displays the increasing amount of cable payed out. Similarly, as the cable is returned to the drum 1242, the counter 1314 reverses directions and counts down the amount of cable that has been payed out. In the illustrated embodiment, the counter 1314 includes a mechanical meter having dials that rotate to display the amount of cable. In other embodiments, the counter 1314 may include a digital screen or meter. The illustrated cable counter 1302 uses an automated design, meaning no user input is required to operate. In some embodiments, the counter 1314 may include a reset button or other means to reset (e.g., zero) the counter 1314 anytime while the cable is being payed out.

Figure 8:
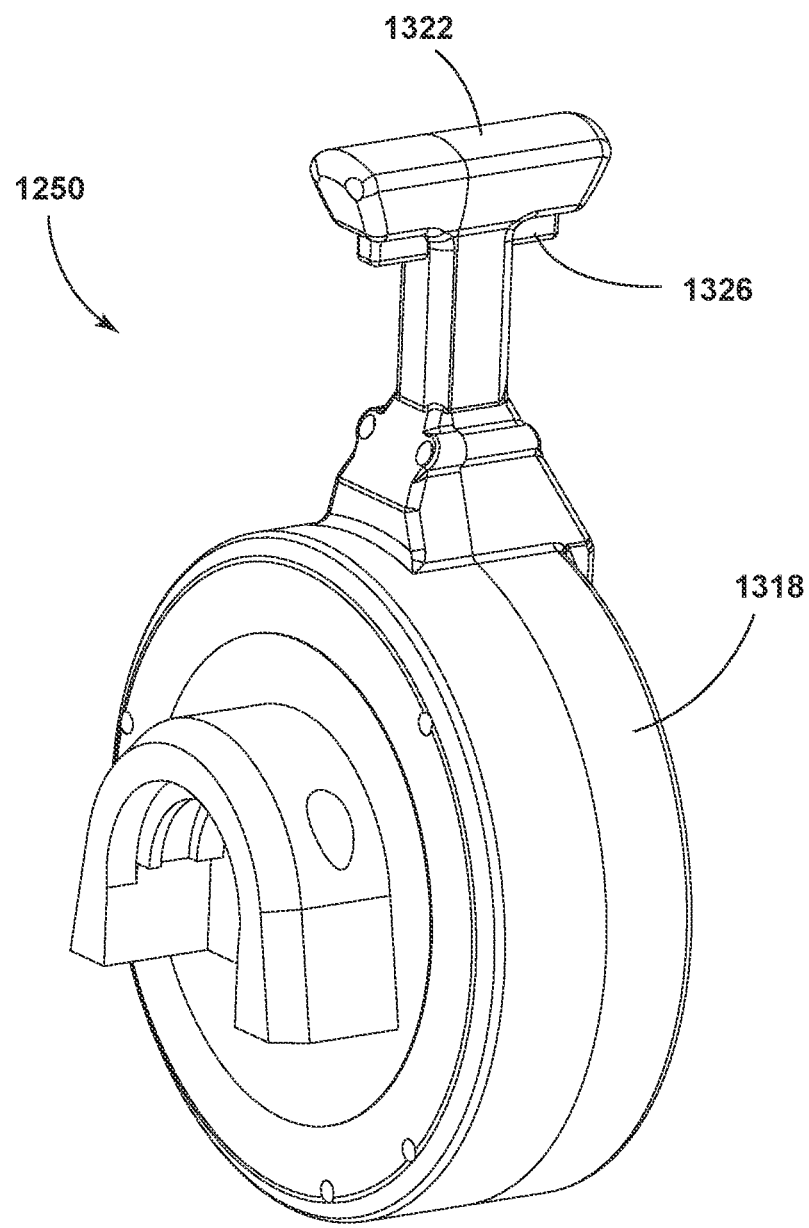
FIG. 8 is a perspective view of a cable feed device of the sewer cleaning machine of FIG. 1.
Figure 9:
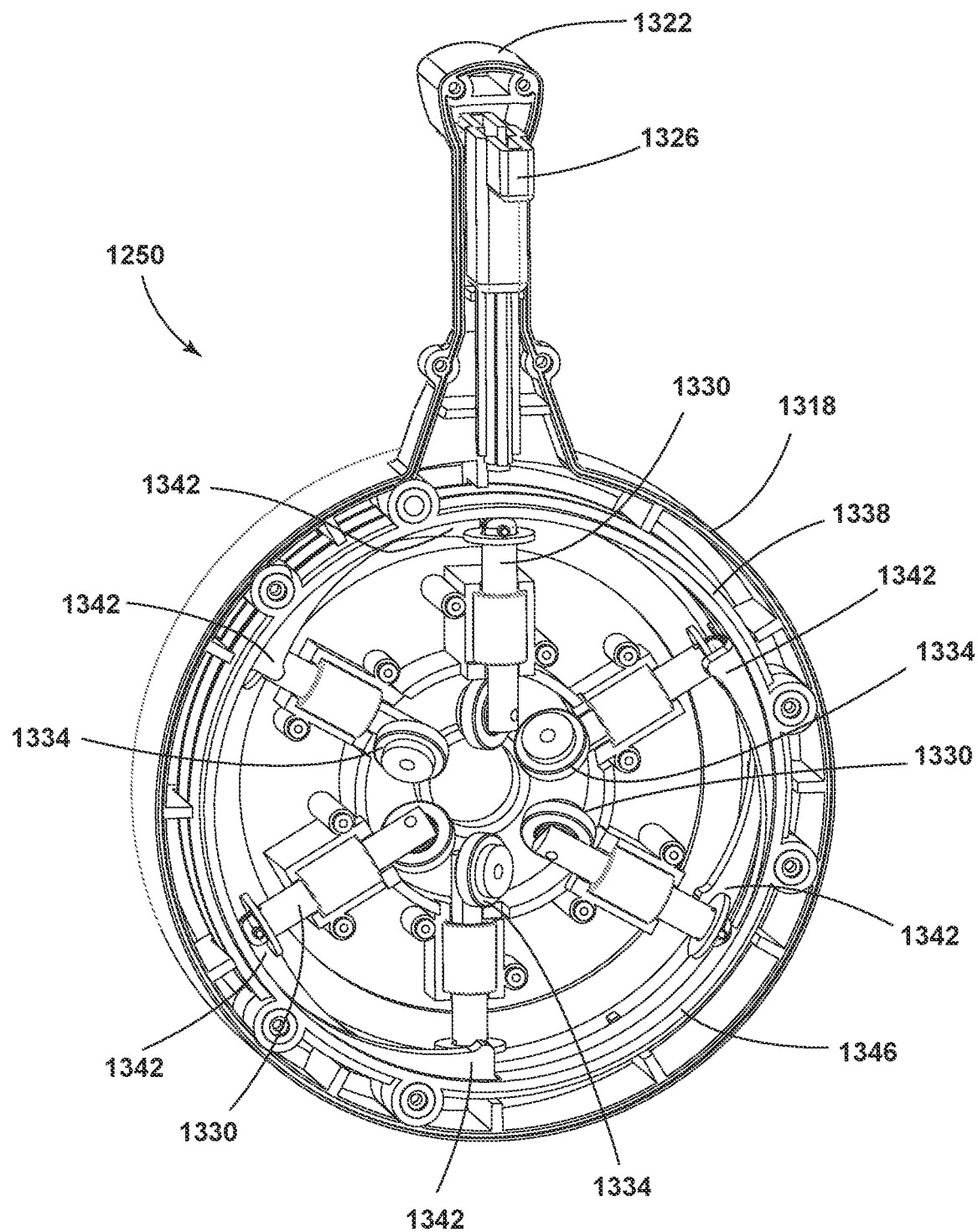
FIG. 9 is a front cross sectional view of the cable feed device of FIG. 8.

FIG. 8 illustrates the cable feed device 1250. The cable feed device 1250 is removably coupled to the opening 1246 with fasteners. The cable feed device 1250 includes a housing 1318 and a handle 1322 with a trigger 1326. With reference to FIG. 9, inside the housing 1318, the cable feed device 1250 includes three forward bearings 1330 and three reverse bearings 1334. The forwards bearings 1330 assist in extending the cable out of the drum 1242, while the reverse bearings 1334 assist in retracting the cable back into the drum 1242. The three forward bearings 1330 are coupled to a first cam ring 1338 that includes three cam surfaces 1342 corresponding to the three forward bearings 1330. The three reverse bearings 1334 are coupled to a second cam ring 1346 that includes three cam surfaces 1342 that correspond to the three reverse bearings 1334. The first and second cam rings 1338, 1346 are coupled to the handle 1322. As seen in FIG. 10, all the bearings 1330, 1334 are spring loaded away from the cable. As seen in FIGS. 11 and 12, by rotating the handle 1322 clockwise, the first and second cam rings 1338, 1346 are rotated clockwise, and the cam surfaces 1342 of the first cam ring 1338 engage the three forward bearings 1330 pushing them into contact with the cable to assist in paying out the cable. By rotating the handle 1322 counter-clockwise, the first and second cam rings 1338, 1346 are rotated counter-clockwise, and the cam surfaces 1342 of the second cam ring 1346 engage the three reverse bearings 1334 pushing them into contact with the cable to assist in retracting the cable.

Figure 13:
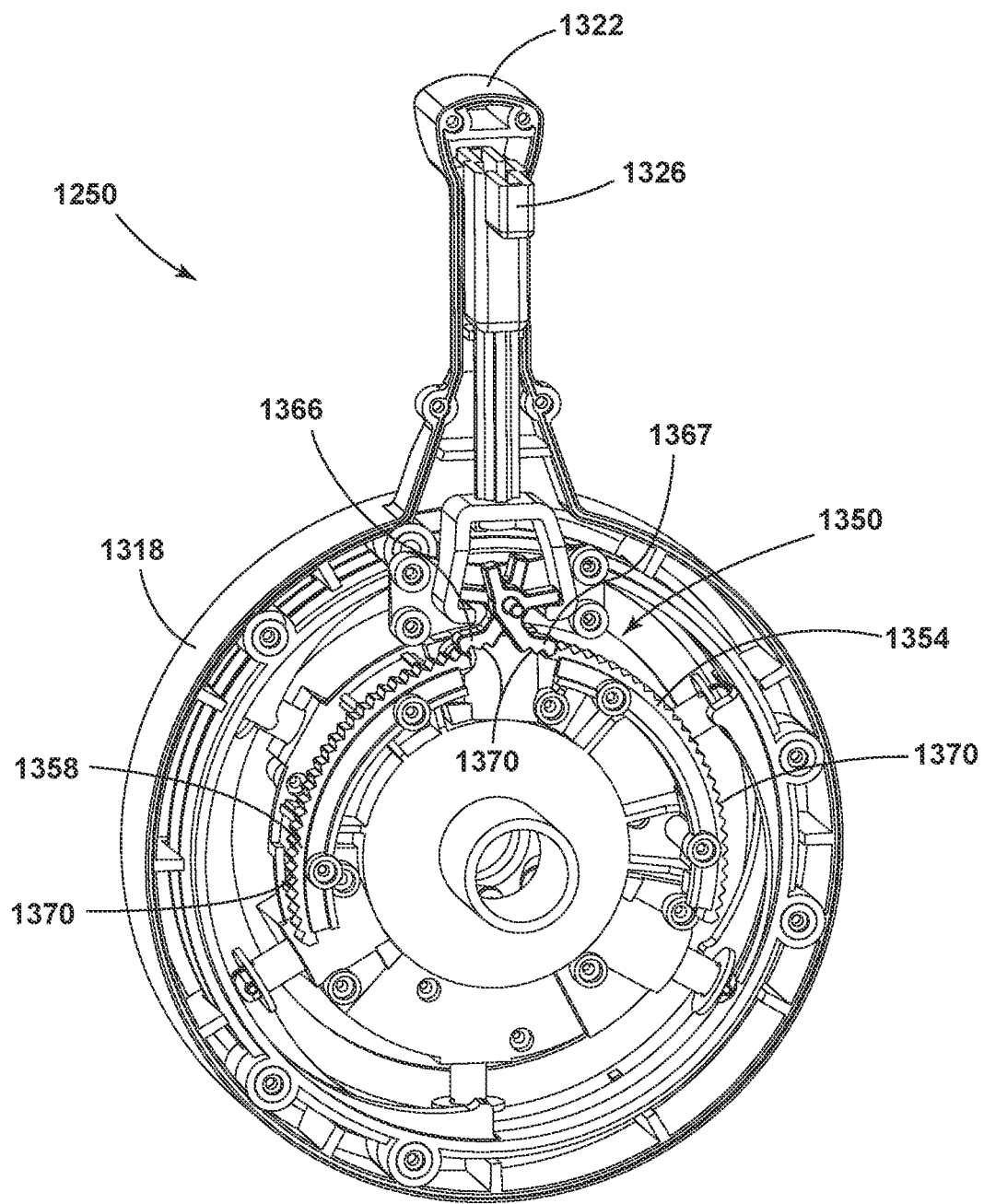
FIG. 13 is a side view of the cable feed device of FIG. 8 with a portion of a housing removed.

With reference to FIG. 13, the cable feed device 1250 further includes a locking element 1350 that locks the handle 1322 in place while either extending or retracting the cable from the drum 1242. The locking element 1350 includes a first ratchet gear 1354, a second ratchet gear 1358, a first forward pawl 1362, and a second reverse pawl 1366. The first ratchet gear 1354 is axially offset from the second ratchet gear 1358 along an axis A defined by the cable. Similarly, the first forward pawl 1362 is axially offset from the second reverse pawl 1366 along the axis A defined by the cable. As such, the first forward pawl 1362 corresponds to the first ratchet gear 1354 and the second reverse pawl 1366 corresponds to the second ratchet gear 1358. Both the first forward pawl 1362 and the second reverse pawl 1366 are rotationally coupled to the trigger 1326. The first forward pawl 1362 and the second reverse pawl 1366 are both resiliently biased towards each other so that when the handle 1322 is moved in a clockwise direction teeth 1370 on the first forward pawl 1362 easily pass over teeth 1370 on the first ratchet gear 1354, and when the handle 1322 is moved in the counter-clockwise direction teeth 1370 on the second reverse pawl 1366 can easily pass over teeth 1370 on the second ratchet gear 1358.

Figure 14:
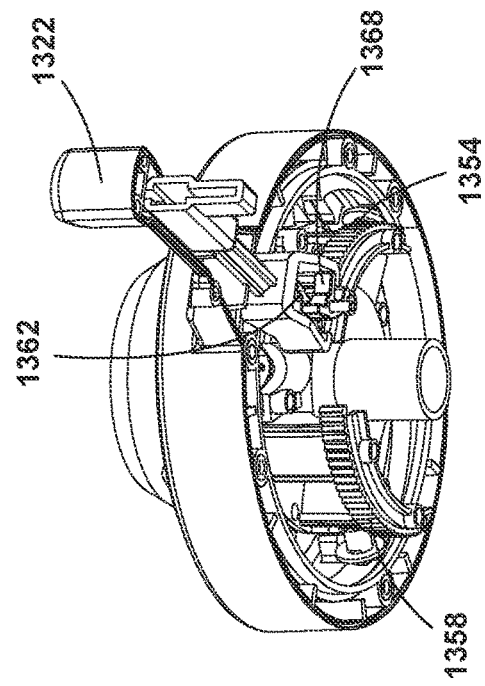
FIG. 14 is a side view of the cable feed device of FIG. 8 with a portion of the housing removed and in the first position.
Figure 15:
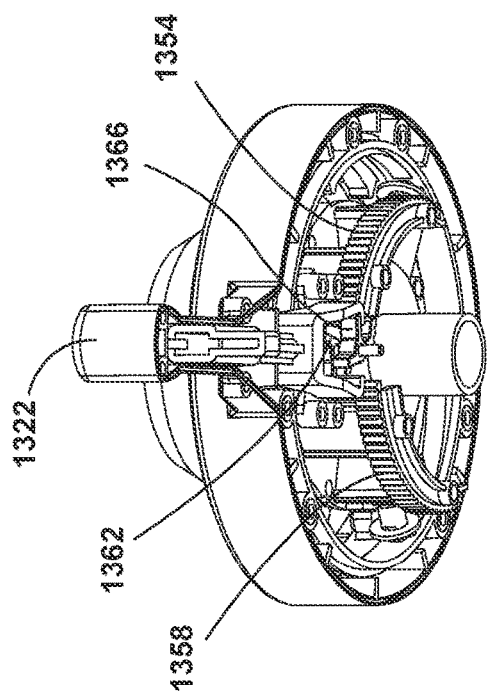
FIG. 15 is a side view of the cable feed device of FIG. 8 with a portion of the housing removed and in the second position.
Figure 16:
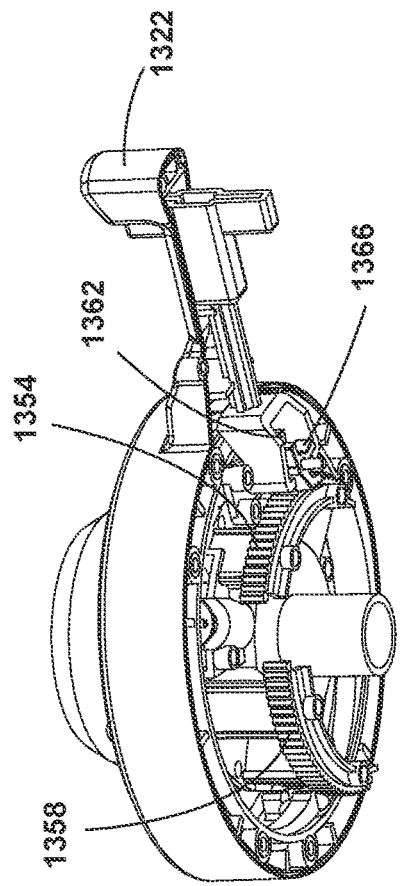
FIG. 16 is a side view of the cable feed device of FIG. 8 with a portion of the housing removed and in the third position.

As shown in FIGS. 14-16, to pay out cable from the drum 1242, a user rotates the handle 1322 clockwise, which engages the three forward bearings 1330 with the cable. At this time, the first forward pawl 1362 slides over the first ratchet gear 1354. Once the handle 1322 is in the desired position, the user releases the handle 1322, causing the teeth 1370 on the first forward pawl 1362 to engage the teeth 1370 on the first ratchet gear 1354, thereby locking the handle 1322 in place due to the bias of the first forward pawl 1362. Similarly, to retract the cable back into the drum 1242, a user rotates the handle 1322 clockwise, which engages the three reverse bearings 1334 with the cable. The second reverse pawl 1366 slides over the second ratchet gear 1358 and once the user releases the handle 1322, the teeth 1370 on the second reverse pawl 1366 engage the teeth 1370 on the second ratchet gear 1358 to lock the handle 1322 in place due to the bias of the second reverse pawl 1366.

In order to unlock the handle 1322 and stop the cable from extending/retracting from the drum 1242, a user pulls the trigger 1326 on the handle 1322, which will pull either the first or second pawl 1362, 1366 out of engagement with either the first or second ratchet gear 1354, 1358. The handle 1322 can then be rotated back to the neutral position. The cable feed device 1350 allows for the cable to be payed out either manually (e.g., when the handle 1322 is in a neutral position) or automatically by engaging either the three forward bearings 1330 or the three reverse bearings 1334. The handle 1322 and locking element provide quick means to easily transition the cable from being automatically payed out or manually payed out.

Figure 18:
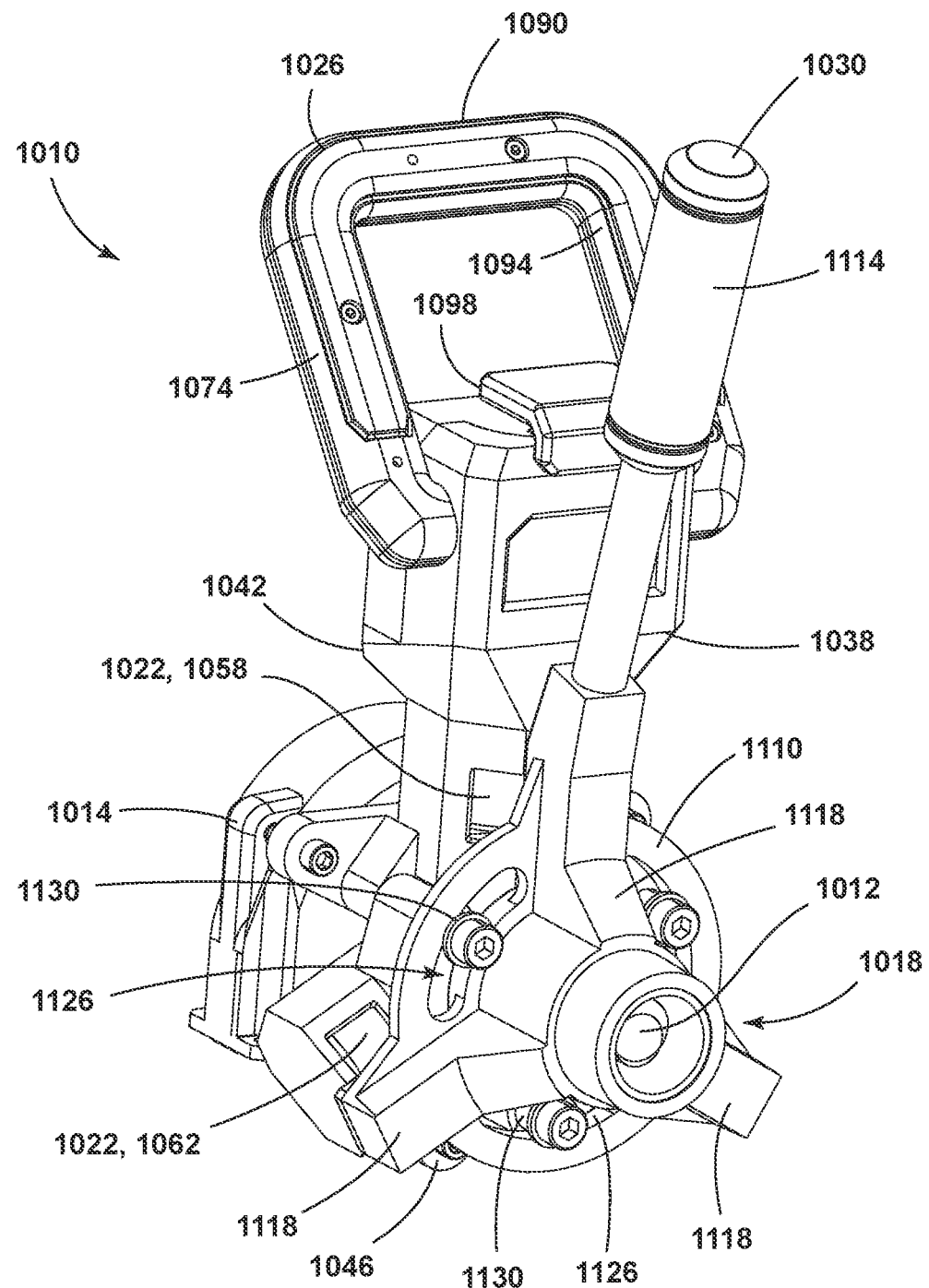
FIG. 18 is a perspective view of a cable feed device according to another embodiment for use with a sewer cleaning machine.
Figure 19:
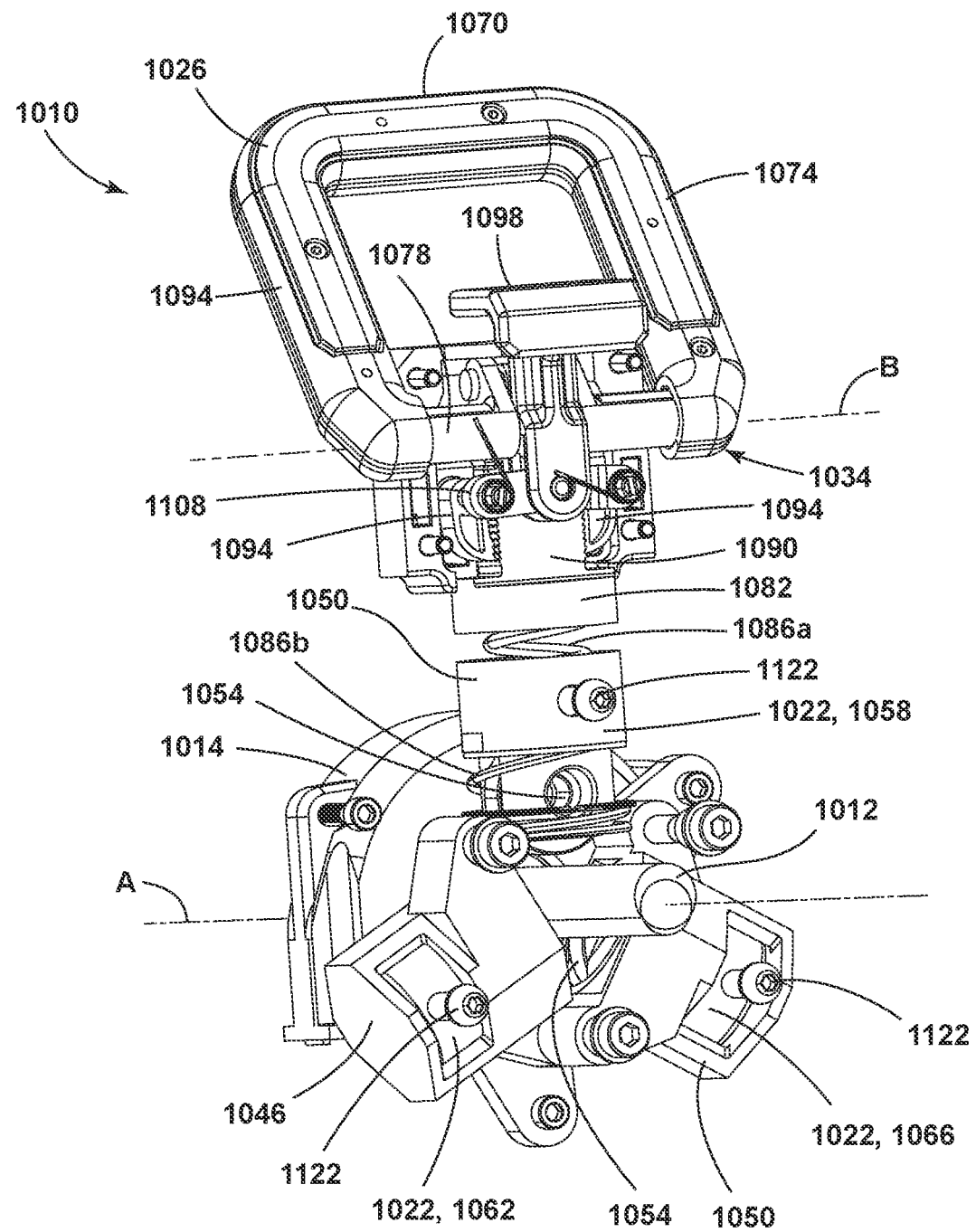
FIG. 19 is a perspective view of the cable feed device of FIG. 18 with portions of a housing and a second lever removed.

FIGS. 18-31 illustrate another embodiment of a cable feed device 1010 for use with a sewer cleaning machine. The cable feed device 1010 is coupled to a drum of the sewer cleaning machine by a mount 1014. In some embodiments, the mount 1014 can be bolted to the drum. With reference to FIGS. 18-19, the cable feed device 1010 includes a passageway 1018 that is aligned with an opening of the drum and guides a cable 1012 from the drum into the drain. The cable feed device 1010 includes a plurality of bearings 1022 for feeding the cable 1012 into the drain, a first lever 1026 for actuating the bearings 1022, a second lever 1030 for controlling the feed direction (i.e., forward or reverse), and a locking assembly 1034 for maintaining the bearings 1022 in an actuated position. These components are supported by a housing 1038. In the illustrated embodiment, the housing 1038 is divided into a main housing 1042 that supports the first lever 1026 and at least one of the bearings 1022, and a secondary housing 1046 that supports the second lever 1030 and at least one of the plurality of bearings 1022.

Referring to FIG. 19, the bearings 1022 are arranged circumferentially around the cable 1012. The illustrated embodiment includes three bearings 1022; however, in other embodiments, a greater or fewer number of bearings 1022 may be used. Each of the bearings 1022 includes a bearing carrier 1050 and a roller 1054. The roller 1054 is rotatably supported within the bearing carrier 1050. In the illustrated embodiment, a first bearing 1058 is positioned within the main housing 1042 and is located above the cable 1012. A second bearing 1062 and a third bearing 1066 are positioned within the secondary housing 1046. The second and third bearings 1022 are located below the cable 1012. The first bearing 1058 is movable within the main housing 1042 to selectively engage the cable 1012. The second and third bearings 1022 are fixed relative to the cable 1012

With reference to FIGS. 20-23, the first lever 1026 can selectively actuate the bearings 1022 to engage the cable 1012 so that the cable 1012 may be fed into the drain. In the illustrated embodiment, the first lever 1026 is a U-shaped lever with a handle portion 1070 and two side portions 1074 extending from opposite ends of the handle portion 1070. The first lever 1026 also includes a lever arm 1078 extending between the two side portions 1074 on an opposite side as the handle portion 1070. In other embodiments, the first lever 1026 can be different shapes and sizes.

Figure 21:
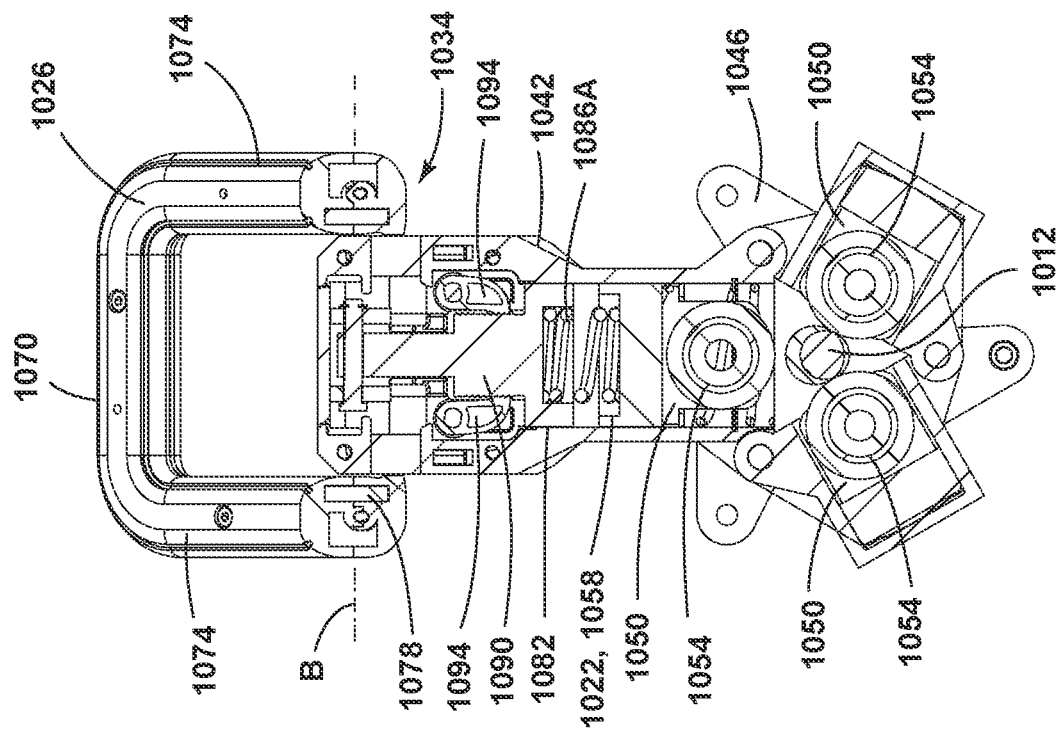
FIG. 21 is a front cross-sectional view of the cable feed device of FIG. 18 in the disengaged position.
Figure 20:
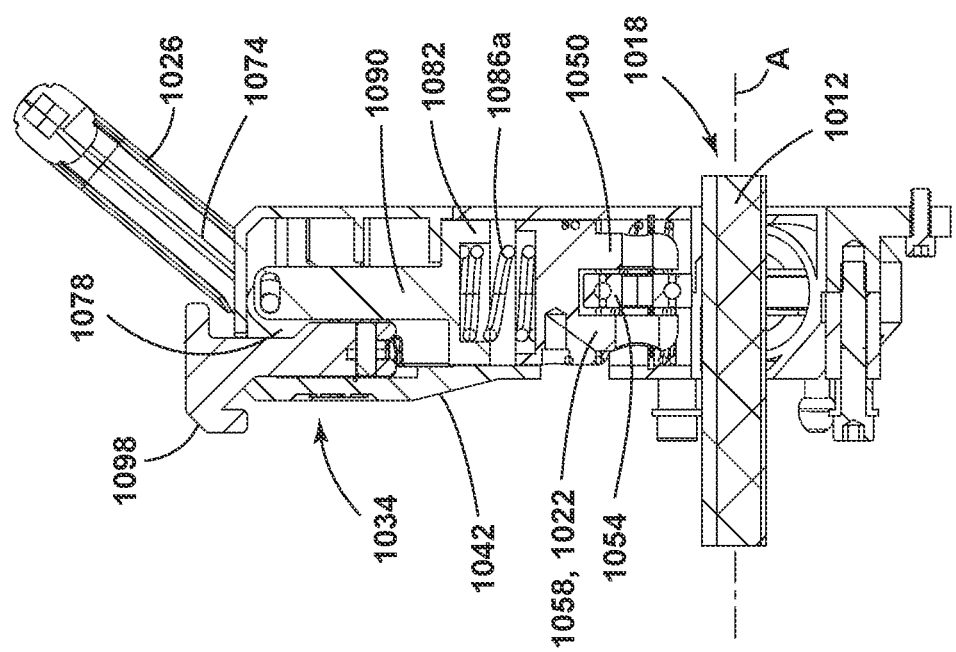
FIG. 20 is a side cross-sectional view of the cable feed device of FIG. 18 in a disengaged position.

FIGS. 20-21 illustrate the first lever 1026 and the bearings 1022 in a disengaged position, and FIGS. 22-23 illustrate the first lever 1026 and the bearings 1022 in an engaged position. When the first lever 1026 is in a disengaged position, the first lever 1026 is oriented in an upward direction and the first bearing 1058 is spaced apart from the cable 1012 such that there is a clearance between the first bearing 1058 and the cable 1012. When the first lever 1026 is in the engaged position, the first lever 1026 is oriented in a horizontal direction and the first bearing 1058 engages the cable 1012. Specifically, the first lever 1026 can be rotated about an axis B from the disengaged position to the engaged position. In the illustrated embodiment, the axis B is perpendicular to the axis A defined by the cable 1012. However, in other embodiments, the axis B can be arranged parallel to the axis A defined by the cable 1012. As the first lever 1026 is rotated to the engaged position, the lever arm 1078 forces a plunger 1082 downward, which, in turn, forces the first bearing 1058 downward and into engagement with the cable 1012.

The first lever 1026, the plunger 1082, and the first bearing 1058 are biased toward the disengaged position by one or more springs. In the illustrated embodiment, a first return spring 1086a biases the plunger 1082 and the first lever 1026 toward the disengaged position, and a second return spring 1086b (FIG. 19) biases the bearing 1052 toward the disengaged position. When the first lever 1026 is rotated to the engaged position, the springs 1086, create a clamping force on the cable 1012. The springs 1086 also exert a return force on the first bearing 1052, the plunger 1082, and the first lever 1026 to return to the disengaged position. The locking assembly 1034 can selectively resist the force of the springs 1086 to maintain the first roller 1054 in the engaged position with the cable 1012.

Figure 25:
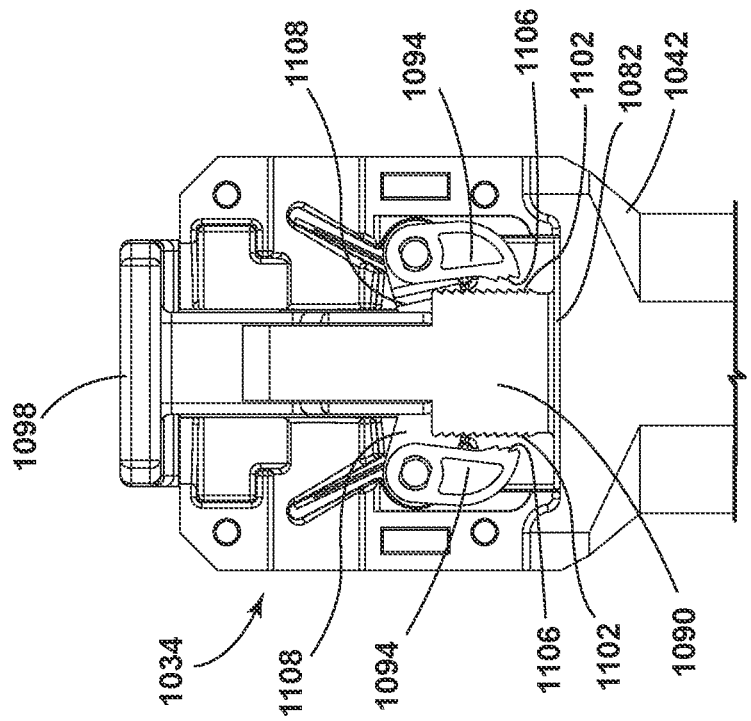
FIG. 25 is a detailed view of the locking assembly of FIG. 24 in an unlocked position.
Figure 24:
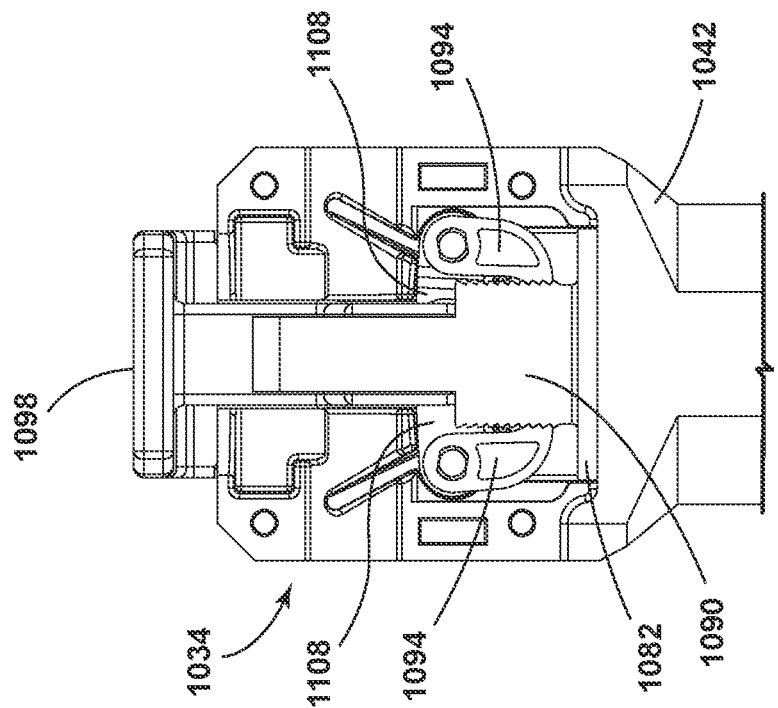
FIG. 24 is a detailed view of a locking assembly of the cable feed device of FIG. 18 in a locked position.
Figure 27:
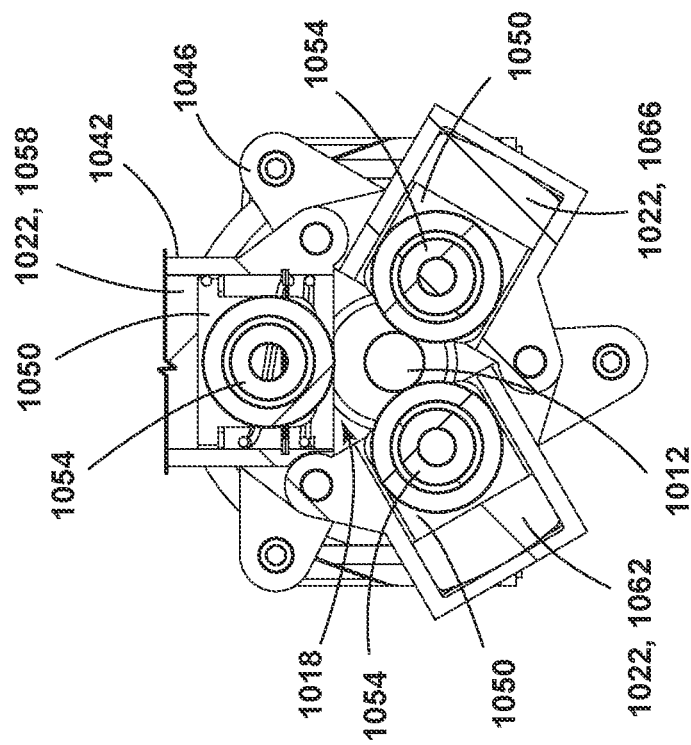
FIG. 27 is a detailed view of a plurality of bearings of the cable feed device of FIG. 18 in the neutral position.
Figure 26:
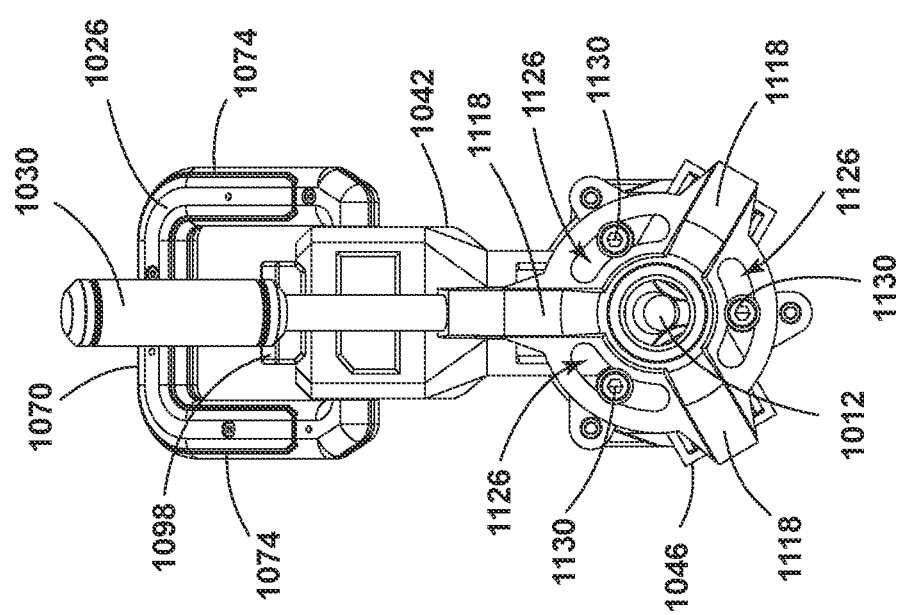
FIG. 26 is a front view of the cable feed device of FIG. 18 with the second lever in a neutral position.

Referring to FIGS. 19 and 24-25, the locking assembly 1034 includes a ratchet gear 1090, at least one pawl 1094, and a release button 1098. In the illustrated embodiment, the ratchet gear 1090 is an extension of the plunger 1082. As shown in FIG. 25, the ratchet gear 1090 includes a set of teeth 1102 on each side of the gear. As previously mentioned, when the first lever 1026 is rotated towards the engaged position, the plunger 1082 and the first bearing 1058 are moved in a downward direction, whereby the first bearing 1058 engages the cable 1012. The pawls 1094 engage the ratchet gear 1090 and maintain the plunger 1082 and the first bearing 1058 in the downward position. In particular, the pawls 1094 each have a set of teeth 1106 that engage with the teeth 1102 of the ratchet gear 1090. Therefore, when the first lever 1026 is released, first bearing 1058 will continue to engage the cable 1012.

To release the locking assembly 1034, a user actuates (e.g., depresses) the release button 1098 to disengage the pawls 1094 from the ratchet gear 1090. Specifically, pressing the release button 1098 downward pivots two linkages 1108, one corresponding to each pawl 1094. Pivoting of the linkages causes the pawls 1094 to rotate away from the ratchet gear 1090 so that the teeth 1106 of the pawls 1094 disengage from the teeth 1102 of the ratchet gear 1090. Once the pawls 1094 are disengaged from the ratchet gear 1090, the return springs 1086 bias the first bearing 1058 and the plunger 1082 upward and away from the cable 1012.

As previously mentioned, the cable feed device 1010 includes a second lever 1030 for controlling the feed direction (i.e., forward or reverse). Referring back to FIGS. 18-19, the second lever 1030 has a control hub 1110 and an elongated handle 1114 extending from the control hub 1110. The control hub 1110 engages with the bearings 1022 and adjusts the bearings 1022 to different orientations corresponding to different feed directions. The handle 1114 rotates the control hub 1110 to thereby adjust the bearings 1022. Specifically, in the illustrated embodiment, the control hub 1110 includes a socket 1118 corresponding to each of the bearings 1022. Furthermore, each bearing 1022 includes a shaft 1122 (FIG. 19) extending from the bearing carrier 1050 into the respective socket 1118. When the control hub 1110 rotates, the sockets 1118 engage the shafts 1122, causing the bearing carriers 1050 to rotate and the rollers 1054 to be oriented to different feed positions. In the illustrated embodiment, the control hub 1110 also includes a series of guide slots 1126 between the sockets 1118. Bolts or guide pins 1130 extend from the housing 1038 through the guide slots 1126 to help guide the control hub 1110 between different rotational positions.

Figure 31:
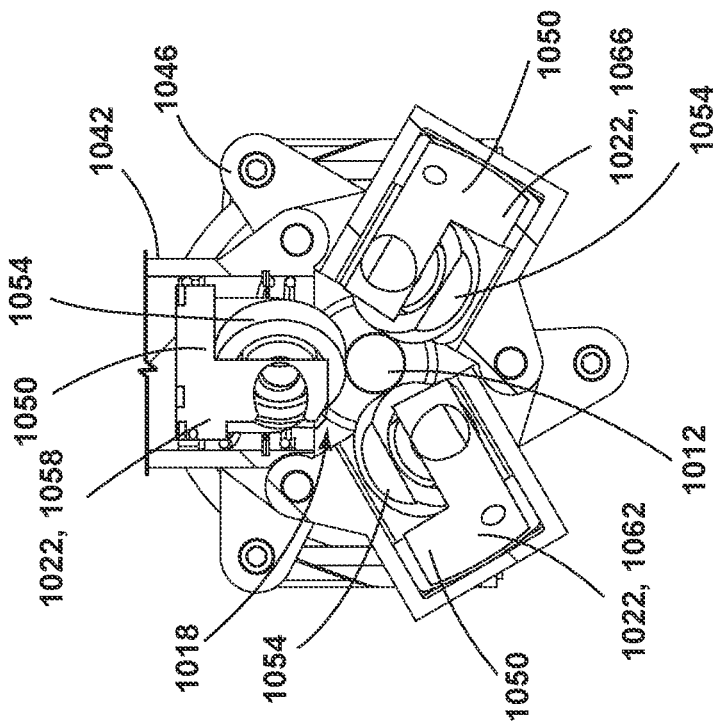
FIG. 31 is a detailed view of the plurality of bearings of FIG. 27 in the reverse feed position.
Figure 30:
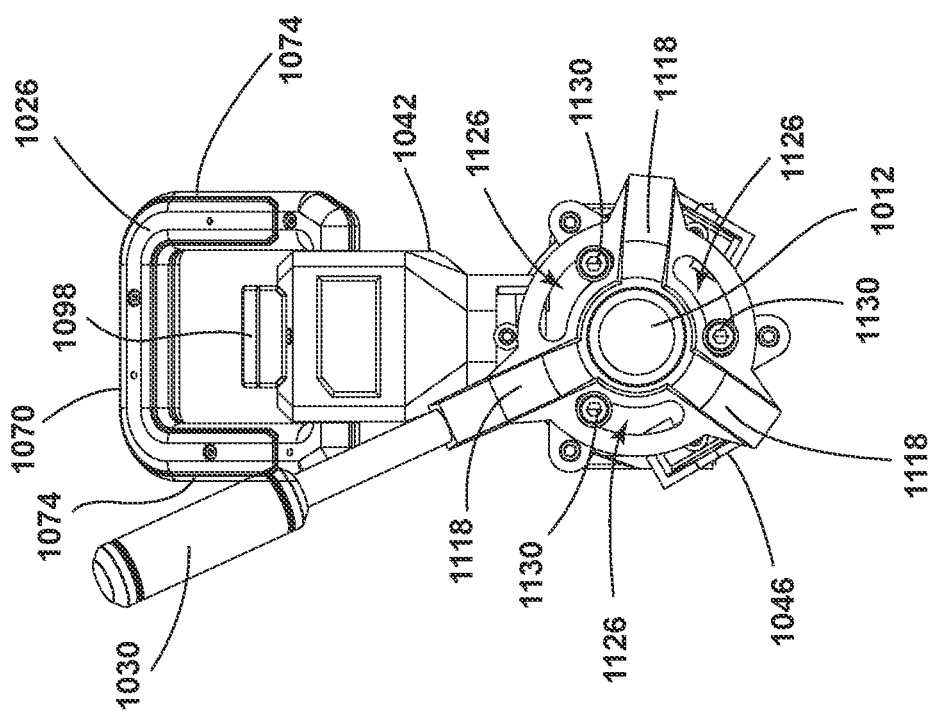
FIG. 30 is a front view of the cable feed device of FIG. 18 with the second lever in a reverse feed position.

FIGS. 26-31 illustrate the second lever 1030 and the bearings 1022 in a neutral position (FIGS. 26-27), a forward position (FIGS. 28-29), and a reverse position (FIGS. 30-31). In the neutral position, the second lever 1030 is oriented centrally such that the second lever 1030 extends vertically upward and is centrally aligned relative to the main housing 1042 and the first lever 1026. The bearings 1022 are arranged with the roller 1054 oriented generally perpendicular to the axis A defined by the cable 1012. When in the neutral position, the bearings 1022 do not feed the cable 1012 in either a forward or a reverse direction. Rather, the cable 1012 rotates in place due to the rotation of the drum.

In the forward position, the second lever 1030 is rotated clockwise (i.e., to the right when oriented as shown in FIG. 28). In the illustrated embodiment, the guide pins 1130 engage with first ends 1134 of the guide slots 1126 to limit rotation of the second lever 1030. The bearings 1022 are arranged with the roller 1054 oriented at a first acute angle relative to the axis A defined by the cable 1012. In the forward position, the bearings 1022 are oriented at an angle that, when engaged with the cable 1012, pays out the cable 1012 from the drum into the drain.

In the reverse position, the second lever 1030 is rotated counter clockwise (i.e., to the left when oriented as shown in FIG. 30). The guide pins 1130 engage with second ends 1138 of the guide slots 1126 to limit rotation of the second lever 1030. The bearings 1022 are arranged with the rollers 1054 oriented at a second acute angle relative to the axis A defined by the cable 1012.

In operation, a user rotates the handle of the second lever 1030 to orient the bearings 1022 in the desired feed position (i.e., neutral, forward, or reverse). The user then rotates the first lever 1026 to an engaged position, whereby the bearings 1022 engage the cable 1012. As described in greater detail above, the plunger 1082 and the first bearing 1058 are translated downward towards the cable 1012. The first bearing 1058 engages the cable 1012 such that all three bearings 1022 are compressed around the cable 1012. Accordingly, once engaged with the cable 1012, the bearings 1022 will feed the cable 1012 in the direction corresponding to the position of the second lever 1030. The locking assembly 1034 locks the bearings 1022 in the engaged position, which will continue to pay out the cable 1012 until the locking assembly 1034 is released. Specifically, the ratchet gear 1090 and pawls 1094 maintain the plunger 1082 and the first bearing 1058 in the engaged position. To unlock the cable feed device 1010, a user presses on the release button 1098 to disengage the pawls 1094 from the ratchet gear 1090. Once released, the return springs 1086 bias the plunger 1082 and the first bearing 1058 away from the cable 1012 towards the disengaged position.

Referring back to FIGS. 2-4, the sewer cleaning machine 1200 is shown in a first operational position. In this position, the drum housing 1214 of the sewer cleaning machine 1200 is supported on a surface to facilitate the clearing of debris from a conduit. In operation, the power supply 1222 supplies power to the first motor 1254 to spin the drum 1242. The cable feed device 1250 draws cable from inside the drum 1242 so that a user may extend the cable into a drain. Rotation of the drum 1242 causes the cable to spin, assisting in the removal of debris from the drain.

With reference to FIG. 1, the sewer cleaning machine 1200 is shown in a second transport position. A user may tilt the frame 1210, lifting the housing 1214 off of a surface and allowing the wheels 1238 to transport the sewer cleaning machine 1200 along the surface. However, due to the weight, the sewer cleaning machine 1200 may be difficult to lift. Specifically, a user may have difficulty transporting the sewer cleaning machine 1200 on stairs. During transportation, the track 1226 may assist in lifting the sewer cleaning machine 1200 both up and down stairs. A user may first position the sewer cleaning device 1200 so that the track 1226 engages the stairs. Once the track 1226 engages the stairs, the user can control the power supply 1222 to operate the second motor 1286. The second motor 1286 rotates the drive shaft 1258, thereby rotating the endless belts 1270, 1278. As the endless belts rotate 1270, 1278, the traction on the belts 1270, 1278 assist in pulling the sewer cleaning machine 1200 up the stairs. Meanwhile, the user can also assist by pulling on the handle 1230 of the sewer cleaning device 1200. To transport the sewer cleaning device 1200 down stairs, a user can control the second motor 1286 to rotate the track 1226 in the opposite direction.

Figure 17:
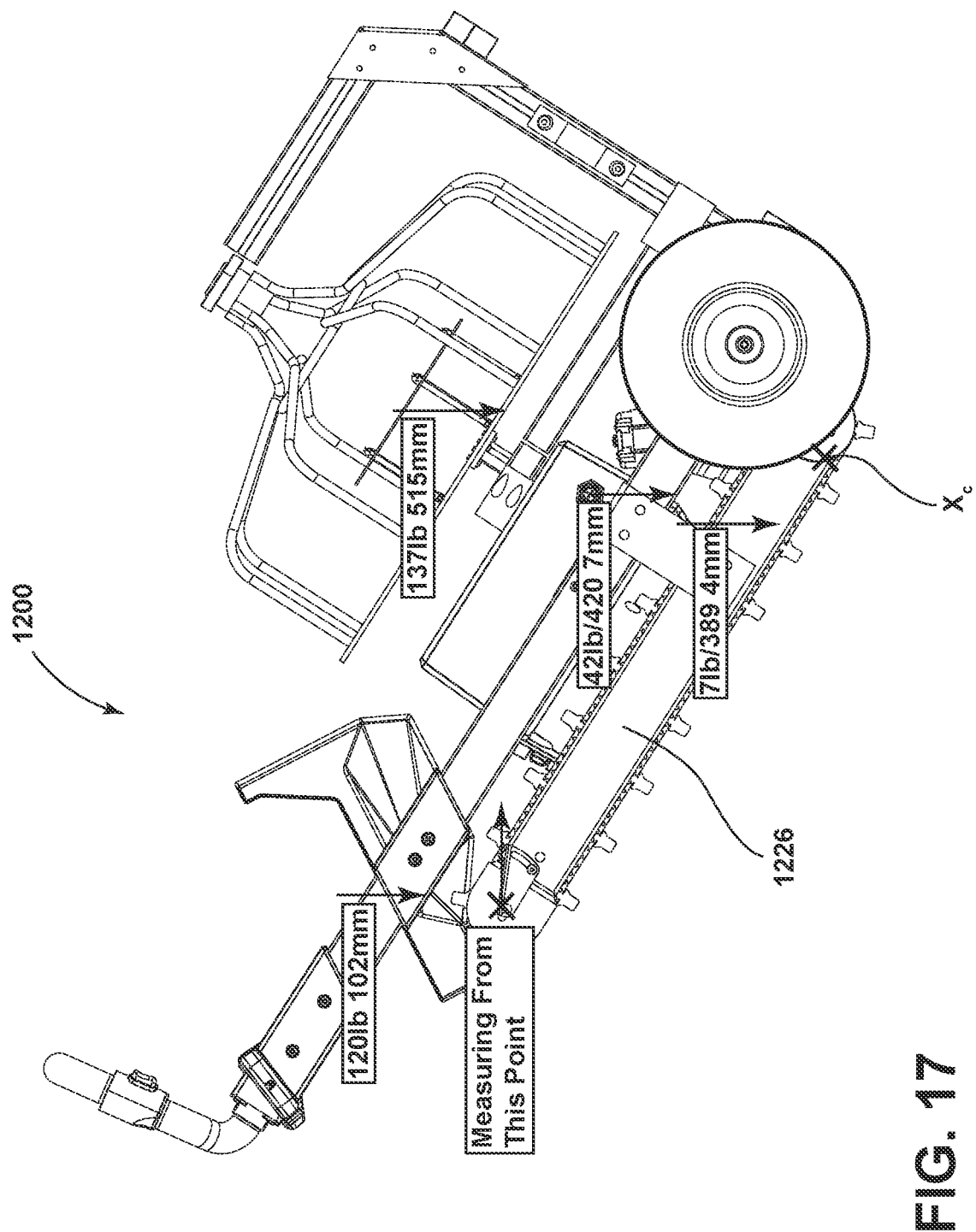
FIG. 17 is a side view of the sewer cleaning machine of FIG. 1 at an angle relative to the horizontal.

With reference to FIG. 17, the center of gravity $X_c$ of the sewer cleaning machine 1200 is positioned on the track 1226 while the sewer cleaning machine 1200 is at an angle relative to the ground (i.e., horizontal). In some embodiments, the angle of the sewer cleaning machine 1200 is between approximately 30 and 35 degrees with the horizontal. In other embodiments, the angle of the sewer cleaning machine 1200 is between approximately 32 and 33 degrees with the horizontal. In further embodiments, the angle of the sewer cleaning machine 1200 is 32.47 degrees with the horizontal, which correlates with the standard US code for the angle of stairs. Positioning the center of gravity $X_c$ on the treads reduces the possibility of the sewer cleaning machine 1200 tipping if a user were to release the sewer cleaning machine 1200 while climbing or descending stairs. In some embodiments, when the sewer cleaning machine 1200 is tilted at an angle less than 35 degrees relative to the horizontal, the center of gravity $X_c$ of the sewer cleaning machine may be above the tracks in a vertical direction. In a further embodiment, when the sewer cleaning machine 1200 is tilted at an angle of less than 33 degrees, the center of gravity $X_c$ is above the treads in a vertical direction.

In some embodiments, the sewer cleaning machine 1200 includes a variable speed trigger that allows for stair climbing at a user selectable speed. In further embodiments, the sewer cleaning machine 1200 is capable of detecting the direction the sewer cleaning machine 1200 is traveling (e.g., through a sensor, (e.g., gyroscope, accelerometer, etc.), or through an input, (e.g., button actuation by a user)). In this embodiment, the controller will automatically set the max pulse width modulation PWM to a lower value (e.g., 80% of max) and maps the range of the speed trigger pull over the remaining PWM range.

In some embodiments, the sewer cleaning machine 1200 only includes one motor and a gearbox that is capable of shifting between rotating the drum 1242 and operating the track 1226. In further embodiments, the motors 1254, 1286 may include a bevel drive. In even further embodiments, the motors 1254, 1286 are capable of handling high voltage. In alternate embodiments, the motors 1254, 1286 offer audible feedback that communicate with the controller to indicate to a user if the cable has encountered debris within a drain.

In some embodiments, the sewer cleaning machine 1200 may include soft-braking with external power resistors that communicate with the controller to achieve a desired brake rate of the drum (e.g., dynamic brake). In some embodiments, the sewer cleaning machine 1200 may include a remote control that communicates with the controller using a wireless connection. The controller would be capable of sending feedback on location, security, job completion, etc. of the sewer cleaning device 1200. In further embodiments, the sewer cleaning machine 1200 may include a rapid soft start, membrane switches, or backlit switches. In even further embodiments, the sewer cleaning machine 1200 includes hall sensors to detect the position of the rotors of the motors 1254, 1286.

Although the invention is described with reference to discrete embodiments of the sewer cleaning machines, variations of the sewer cleaning machines exist within the spirit and scope of the invention.

Various features and advantages of the invention are set forth in the following claims.

The invention claimed is:

1. A sewer cleaning machine comprising:
   a rotatable drum;
   a cable positioned at least partially within the drum, the cable configured to be extended from and retracted into the drum along a cable axis; and
   a cable feed mechanism including:
      a first plurality of bearings arranged concentrically around the cable, the first plurality of bearings configured to selectively engage the cable to feed the cable in a first linear direction along the cable axis, and
      a second plurality of bearings arranged concentrically around the cable and arranged in an alternating pattern between the first plurality of bearings, the second plurality of bearings configured to selectively engage the cable to feed the cable in a second linear direction along the cable axis opposite the first direction.

2. The sewer cleaning machine of claim 1, wherein the cable feed mechanism includes a first cam ring having a first plurality of cam surfaces, each of the first plurality of cam surfaces engageable with a corresponding one of the first plurality of bearings.

3. The sewer cleaning machine of claim 2, wherein the cable feed mechanism includes a handle, the handle configured to rotate the first cam ring to move the first plurality of cam surfaces into engagement with the first plurality of bearings.

4. The sewer cleaning machine of claim 3, wherein the first plurality of bearings is spring biased away from the cable, and wherein engagement of the first plurality of cam surfaces with the first plurality of bearings moves the first plurality of bearings against the spring bias into engagement with the cable.

5. The sewer cleaning machine of claim 2, wherein the cable feed mechanism includes a second cam ring having a second plurality of cam surfaces, each of the second plurality of cam surfaces engageable with a corresponding one of the second plurality of bearings.

6. The sewer cleaning machine of claim 5, wherein rotation of the first cam ring in a first rotational direction about the cable axis moves the first plurality of bearings into engagement with the cable, and wherein rotation of the second cam ring in a second rotational direction about the cable axis moves the second plurality of bearings into engagement with the cable.

7. The sewer cleaning machine of claim 1, wherein the cable feed mechanism includes a locking element configured to selectively maintain engagement between the cable and at least one of the first plurality of bearings and the second plurality of bearings.

8. The sewer cleaning machine of claim 7, wherein the locking element includes a first pawl engageable with a first ratchet gear and a second pawl engageable with a second ratchet gear.

9. The sewer cleaning machine of claim 8, wherein the cable feed mechanism includes a handle, and wherein rotation of the handle in a first direction about the cable axis moves the first pawl relative to the first ratchet gear and wherein rotation of the handle in a second direction about the cable axis moves the second pawl relative to the second ratchet gear.

10. The sewer cleaning machine of claim 9, wherein the handle includes a trigger, and wherein actuation of the trigger disengages at least one of the first pawl and the second pawl from a respective one of the first ratchet gear and the ratchet second gear.

11. A sewer cleaning machine comprising:
a rotatable drum;
a cable positioned at least partially within the drum, the cable configured to be extended from and retracted into the drum along a cable axis; and
a cable feed mechanism including:
   a plurality of bearings arranged concentrically around the cable, the plurality of bearings configured to selectively engage the cable to feed the cable in a linear direction along the cable axis,
   a cam ring including a plurality of cam surfaces, each of the plurality of cam surfaces engageable with a corresponding one of the plurality of bearings to move the plurality of bearings toward the cable, and
   a handle configured to rotate the cam ring about the cable axis to move the plurality of cam surfaces into engagement with the plurality of bearings.

12. The sewer cleaning machine of claim 11, wherein each of the plurality of bearings is spring biased away from the cable, and wherein engagement of the plurality of cam surfaces with the plurality of bearings moves the plurality of bearings against the spring bias into engagement with the cable.

13. The sewer cleaning machine of claim 11, wherein the cable feed mechanism includes a locking element configured to selectively maintain engagement between the cable and the plurality of bearings.

14. The sewer cleaning machine of claim 13, wherein the locking element includes a ratchet gear and a pawl.

15. The sewer cleaning machine of claim 14, wherein rotation of the handle moves the pawl relative to the ratchet gear.

16. The sewer cleaning machine of claim 15, wherein the handle includes a trigger, and wherein actuation of the trigger disengages the pawl from the ratchet gear.

17. The sewer cleaning machine of claim 11, wherein rotation of the handle about the cable axis rotates the cam ring about the cable axis to move the plurality of cam surfaces into engagement with the plurality of bearings.

18. A sewer cleaning machine comprising:
a rotatable drum;
a cable positioned at least partially within the drum, the cable configured to be extended from and retracted into the drum along a cable axis; and
a cable feed mechanism including:
   a plurality of bearings arranged concentrically around the cable, the plurality of bearings configured to selectively engage the cable to feed the cable in a first linear direction along the cable axis,
   a handle configured to move the plurality of bearings into engagement with the cable, and
   a locking element configured to selectively maintain engagement between the cable and the plurality of bearings, the locking element including a ratchet gear and a pawl,
wherein the ratchet gear extends concentrically about the cable axis, and wherein rotation of the handle about the cable axis moves the pawl relative to the ratchet gear.

19. The sewer cleaning machine of claim 17, wherein the handle includes a trigger, and wherein actuation of the trigger disengages the locking element.

20. The sewer cleaning machine of claim 19, wherein the cable feed mechanism includes a cam ring having a plurality of cam surfaces, each of the plurality of cam surfaces engageable with a corresponding one of the plurality of bearings, and wherein rotation of the handle about the cable axis rotates the cam ring to move the plurality of cam surfaces into engagement with the plurality of bearings.

\* \* \* \* \*